US005757522A

United States Patent [19]
Kulick et al.

[11] Patent Number: 5,757,522
[45] Date of Patent: May 26, 1998

[54] METHOD FOR ELECTRO-OPTICALLY RENDERING A HOLOGRAPHIC IMAGE

[75] Inventors: Jeffrey H. Kulick; Stephen T. Kowel, both of Huntsville, Ala.

[73] Assignee: Univeristy of Alabama in Huntsville, Huntsville, Ala.

[21] Appl. No.: 758,901

[22] Filed: Dec. 2, 1996

Related U.S. Application Data

[62] Division of Ser. No. 11,782, Feb. 1, 1993, Pat. No. 5,581,378.

[51] Int. Cl.$^6$ .................................................. G03H 1/08
[52] U.S. Cl. ............................... 359/9; 359/23; 359/900; 364/525
[58] Field of Search .................... 359/9, 22, 23, 359/25, 32, 900; 348/40; 364/525

[56] References Cited

U.S. PATENT DOCUMENTS

| | | | |
|---|---|---|---|
| 3,832,027 | 8/1974 | King | 359/23 |
| 4,345,248 | 8/1982 | Togashi et al. | 345/206 |
| 4,408,277 | 10/1983 | Cortellini et al. | 364/525 |
| 4,717,949 | 1/1988 | Eichenlaub | 345/6 |
| 4,778,262 | 10/1988 | Haines | 359/9 |
| 4,980,775 | 12/1990 | Brody | 345/205 |
| 5,056,895 | 10/1991 | Kahn | 359/74 |
| 5,119,214 | 6/1992 | Nishii et al. | 359/9 |
| 5,128,782 | 7/1992 | Wood | 345/102 |
| 5,189,500 | 2/1993 | Kusunoki | 359/72 |
| 5,194,971 | 3/1993 | Haines | 359/9 |
| 5,237,433 | 8/1993 | Haines et al. | 359/9 |
| 5,266,531 | 11/1993 | Kikinis | 437/228 |
| 5,291,317 | 3/1994 | Newswanger | 359/15 |
| 5,293,261 | 3/1994 | Shashidhar et al. | 359/87 |
| 5,301,062 | 4/1994 | Takahashi et al. | 359/567 |
| 5,347,375 | 9/1994 | Saito et al. | 382/31 |
| 5,402,143 | 3/1995 | Ge et al. | 345/5 |

OTHER PUBLICATIONS

C. Barillot, *Surface And Volume Rendering Techniques To Display 3-D Data,* IEEE Engineering In Medicine And Biology, Mar. 1993, pp. 111–119.

M. Clement, et al., *Effects Of Residual Gases and Rf Power On ITO Rf Sputtered Thin Films,* Vacuum, Vol. 37, No. 5/6, 1987, pp.447–449.

Green, et al., *Exploiting Coherence For Multiprocessor Ray Tracing,* IEEE Computer Graphics & Applications, Nov. 1989, pp. 12–26.

K. Haines, et al., *Computer Graphics For Holography,* IEEE Computer Graphics & Applications, Jan. 1992, pp. 37–46.

A. Hefner, et al., *Reliability of Polyimide/Nitride Dielectrics for Multilevel Metallization Systems,* V–Mic Conference, Jun. 13–14, 1988, pp. 476–483.

C. H. Henager, Jr., et al., *Thermal Conductivities Of Thin, Sputtered Optical Films,* Applied Optics, vol. 32, No. 1, Jan. 1993, pp. 91–100.

A. Hopper, et al., *A Feasibility Study For The Fabrication of Planar Silicon Multichip Modules Using Electron Beam Lithography For Precise Location And Interconnection Of Chips,* IEEE Transactions On Components, Hybrids, And Manufacturing Technology, vol. 15, No.1, Feb. 1992, pp.97–102.

M. Lucente, *Optimization Of Hologram Computation For Real–Time Display,* SPIE Conference On Practical Holography VI, vol. 1667, 1992.

(List continued on next page.)

*Primary Examiner*—Paul M. Dzierzynski
*Assistant Examiner*—John Juba, Jr.
*Attorney, Agent, or Firm*—Bell Seltzer Intellectual Property Law Group of Alston & Bird LLP

[57] ABSTRACT

A display method for producing a plurality of different views of an object scene simultaneously is provided. A series of two-dimensional projections of an object is produced for the plane of a display device. Wavefront interference information, independent of the two-dimensional projections is produced for an intermediate plane. The two-dimensional projections and the wavefront interference information are combined to create a diffraction grating in the display device to provide a holographic image of the object scene from a number of positions relative to the display device.

10 Claims, 15 Drawing Sheets

OTHER PUBLICATIONS

A. Mori, et al., *A New Face Down Bonding Technique Using a Low Melting Point Metal*, IEEE Transactions on Components, Hybrids, and Manufacturing Technology, Vol. 13, No. 2, Jun. 1990, pp. 444–447.

A. O'Hara, et al., *Mirror Quality and Efficiency Improvements of Reflective Spatial Light Modulators By the Use of Dielectric Coatings and Chemical–Mechanical Polishing Applied Optics*, Vol. 32, No. 28, 1 October 1993, pp. 5549–5556.

Pai, *Planarization For 0.5um CMOS/BiCMOS Technology*, V–MIC Conference, Jun. 12–13, 1990, pp. 450–452.

J. Prost, et al., *Flexoelectricity In Nematic And Smectic–A Liquid Crystals*, Journal Of Applied Physics, Vol. 47, No. 6, Jun. 1976, pp. 2298–2312.

Sato, et al., *Holographic Television By Liquid Crystal Device*, 3rd Int. Conf. On Holographic Systems, Comp. & Appln., No. 342, Sep. 16–18, 1991, pp. 20–23.

R. A. Soref, *Field Effects In Nematic Liquid Crystals Obtained With Interdigital Electrodes*, Journal Of Applied Physics, Vol. 45, No. 12, Dec. 1974, pp. 5466–5468.

OBJECT

REAL IMAGE

ILLUMINATION

DIFFUSER

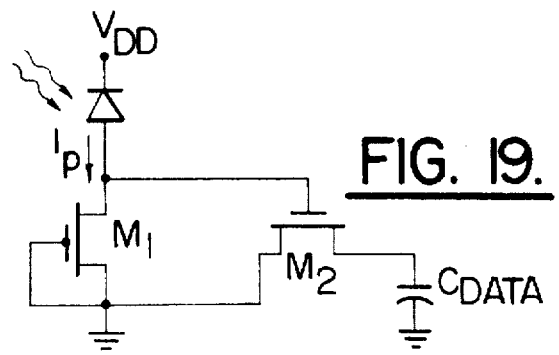
FIG. 19.
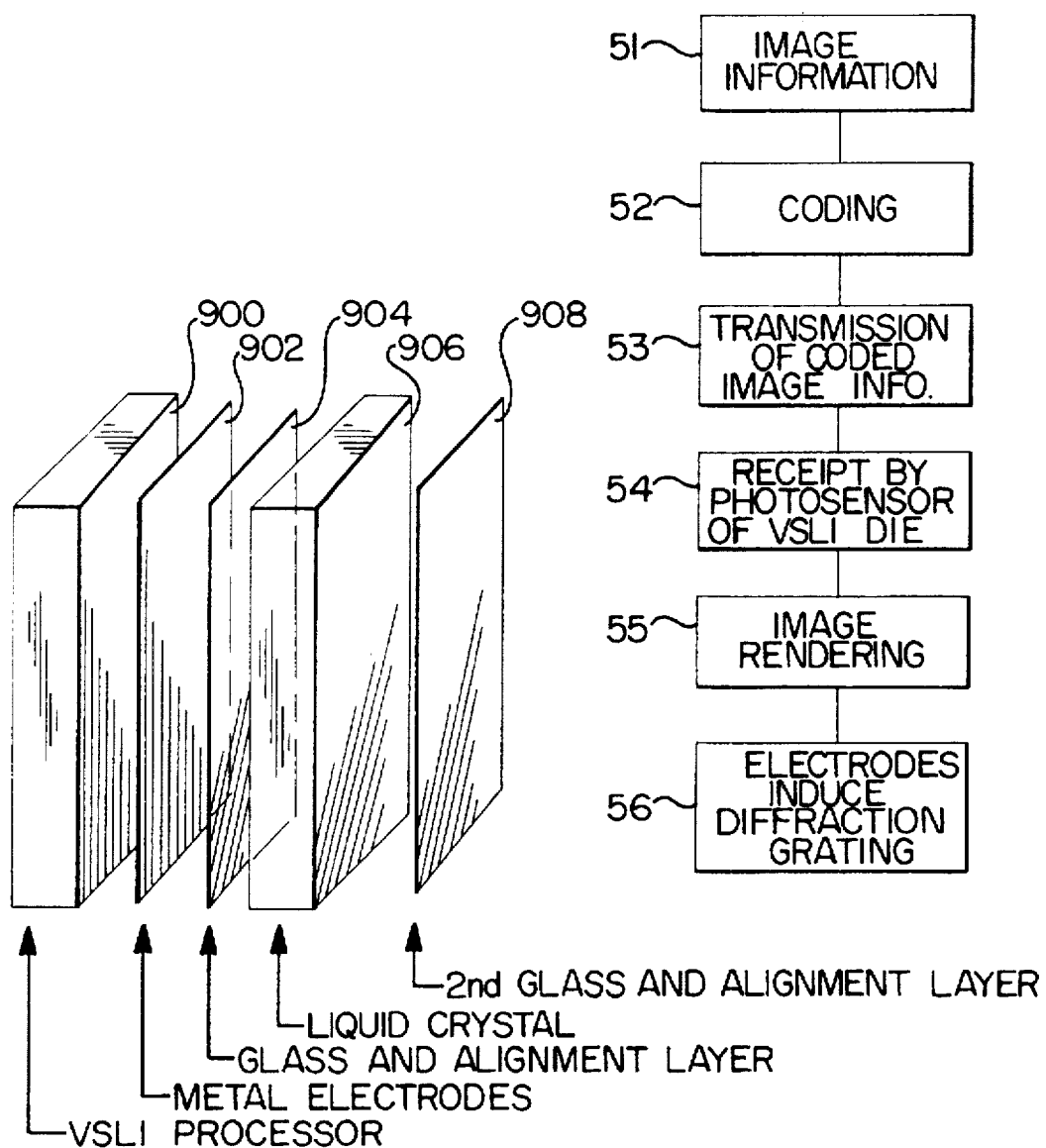
FIG. 20.
- 51 — IMAGE INFORMATION
- 52 — CODING
- 53 — TRANSMISSION OF CODED IMAGE INFO.
- 54 — RECEIPT BY PHOTOSENSOR OF VSLI DIE
- 55 — IMAGE RENDERING
- 56 — ELECTRODES INDUCE DIFFRACTION GRATING
FIG. 21.
- 900 — VSLI PROCESSOR
- 902 — METAL ELECTRODES
- 904 — GLASS AND ALIGNMENT LAYER
- 906 — LIQUID CRYSTAL
- 908 — 2nd GLASS AND ALIGNMENT LAYER

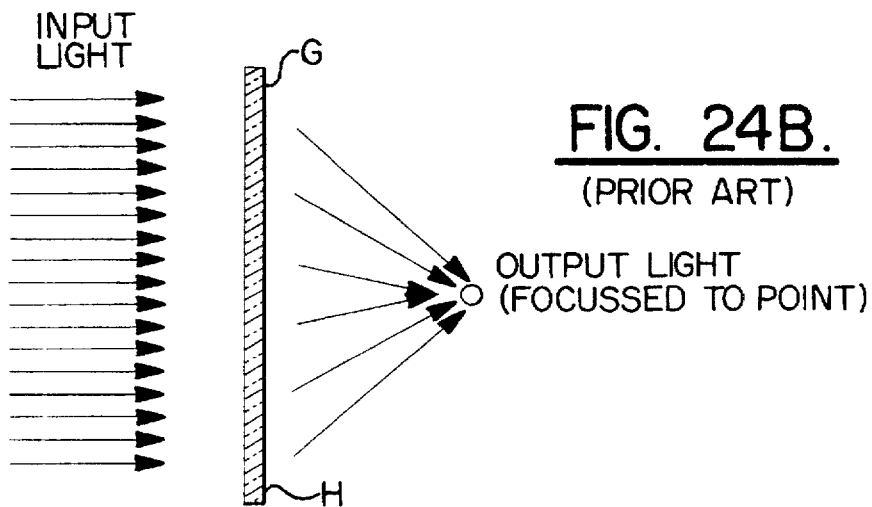
FIG. 24B.
(PRIOR ART)
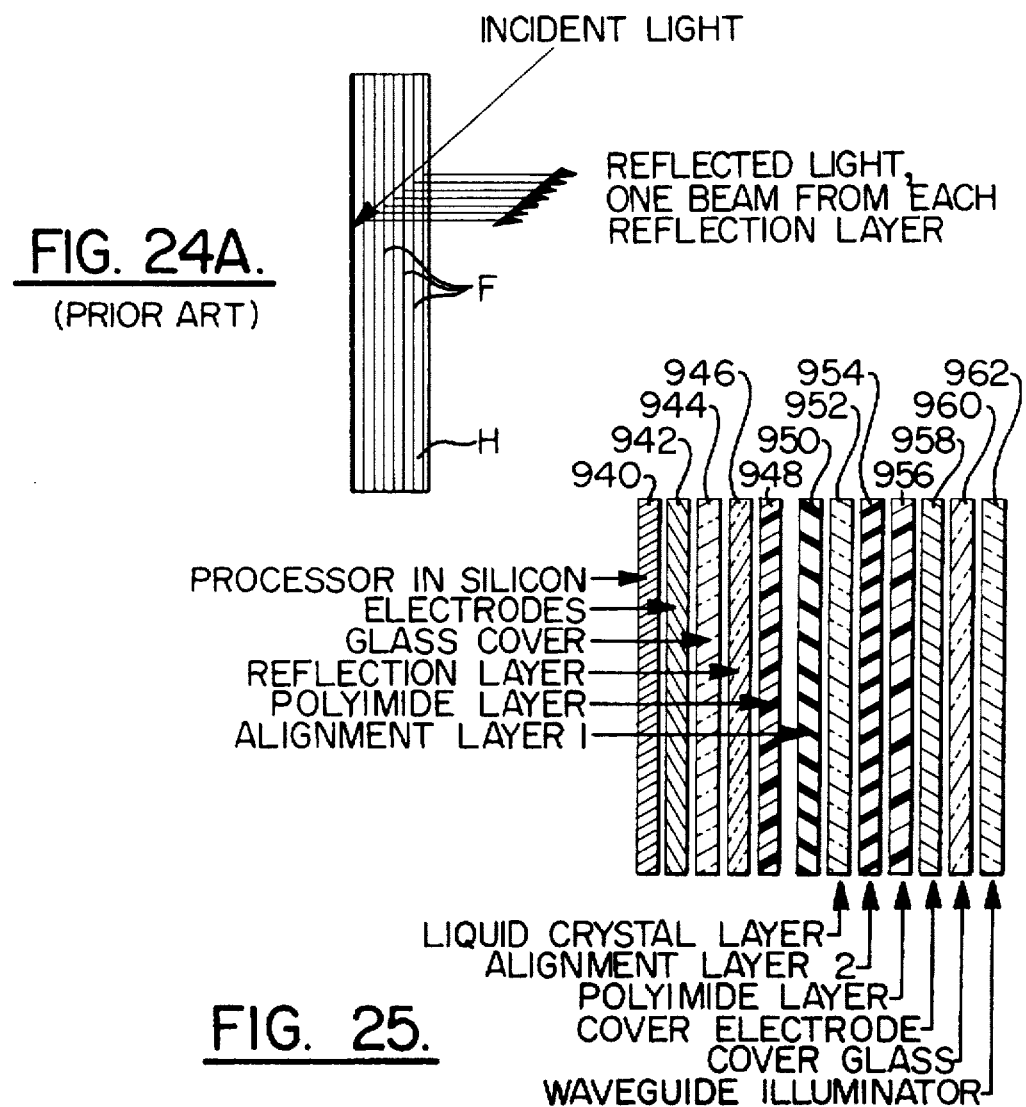
FIG. 24A.
(PRIOR ART)
FIG. 25.

METHOD FOR ELECTRO-OPTICALLY RENDERING A HOLOGRAPHIC IMAGE

This application is a divisional of application Ser. No. 08/011,782, filed Feb. 1, 1993 now U.S. Pat. No. 5,581,378.

GOVERNMENT RIGHTS TO INVENTION

This invention was made with U.S. Government support under contracts DAAH01-89-D-0134 D.O. 0040 and DAAH01-91-D-R005 D.O. 0009 awarded by the U.S. Army Missile Command. The Government has certain rights in this invention.

BACKGROUND OF THE INVENTION

1. Field of the Invention

The invention relates to display systems which are capable of providing three-dimensional images. More particularly, the present invention provides a holographic display system which can display three-dimensional images.

In particular, the display system can provide different perspective images for different vantage points simultaneously. Simpler versions can provide monochromatic images, however in more sophisticated versions color images may also be provided.

2. Discussion of Background

Three-dimensional display systems are increasingly in demand for a wide variety of applications. Dimensional imaging can be advantageously utilized in medical, military and entertainment fields. In general, the image to be displayed can be provided by a camera or generated by computer. An image to be displayed may also be generated by a combination of the two, such as where an image provided by a camera is combined with a superposed image, such as a grid which indicates the size or location of the camera generated image. The image could also be based upon ultrasound, magnetic resonance, or other types of sensing/recording instruments. Whether the images are provided by a camera or other instrument, the image can also be modified or enhanced by a computer.

When a human observes an object, the object is observed as three-dimensional (including height, width and depth), with the depth perception resulting from the simultaneous observation of the object from two different observation points corresponding to each of the observer's two eyes. In a display system, often a three-dimensional image is represented by a two-dimensional projection, or in other words, the depth of the object is merely represented as a projection extending from a top or side of the object and may, for example, be tapered somewhat to give the appearance of depth. However, such a two-dimensional projection is not a true three-dimensional image, since the same image would be observed by each eye. In a typical three-dimensional movie, a stereo view is provided which is more nearly three-dimensional than a two-dimensional projection since a different image is provided for each of the observer's eyes. However, such a view is stereoscopic, not truly three-dimensional because observers at different vantage points in the theater see the same image, and the image is truly correct only for the viewer located in the position for which the stereo image was created. In addition, special glasses are also necessary to view the three-dimensional image.

An early form of three-dimensional imaging, referred to as a Wheatstone stereoscope, is shown in FIG. 1. In this arrangement, the observer is provided with a dimensional image as a result of the simultaneous observation of two different images, with a different image provided for each eye. In viewing the images, the observer would look into a viewing device in which the right eye would observe a first picture 1, typically via a mirror 1a, while the left eye observes a second picture 2 via mirror 2a. The resultant image appears three-dimensional to the observer since the respective pictures 1, 2 are of the same subject matter, however they are taken from two different vantage points. More particularly, the first picture would be formed by a camera obtaining an image of a given subject matter, with the second image formed by a camera recording the same subject matter, however with the vantage point for the second camera spaced from the vantage point of the first camera by a specified distance (typically about 65 mm, which is an average inter-ocular spacing between a viewer's eyes). The images can be recorded substantially simultaneously by a camera having two lenses which are spaced by the inter-ocular separation, or may be formed by a single camera mounted upon a slide bar or rail such that an image is formed at one vantage point, and the camera is moved by the inter-ocular separation to a second vantage point at which the second image is formed. By virtue of the simultaneous observation of two different images of the same subject matter, a three-dimensional appearance is provided to the viewer. However, the image is not truly a three-dimensional representation of the subject matter, since the image lacks motion parallax. In other words, the reproduced image does not change when the observer of the reproduced image changes their vantage point or viewing direction.

FIG. 2 shows a second form of stereoscopic display referred to as a lenticular display. This type of display was often found in Cracker-Jack boxes in the 1950's. In this arrangement, a lenticular lens sheet 10 is provided which includes a set of cylindrical lenses 10a. A picture 12 is provided which has been taken by a camera while moving, with the picture taken through the same lenticular lens utilized during playback or viewing. For a particular vantage point of the observer, a stereo pair is respectively played back respectively to each of the left and right eyes (i.e. one view for each eye), with the viewer only seeing a view recorded by the camera for a particular instant. Thus, as the viewer moves horizontally in viewing the image (the up and down direction in FIG. 2), the viewer will observe different stereo pairs successively corresponding to different instances recorded by the camera. A lenticular display thus contains three-dimensional information and is an improvement over the Wheatstone stereograph in that it provides motion parallax or horizontal parallax (i.e., different images as the observer moves horizontally with respect to the display). However, the lenticular display does not provide vertical parallax and thus cannot itself provide for a complete full parallax three-dimensional image.

In a fly's eye display, both vertical and horizontal parallax are provided as the image is recorded and played back through a rectangular array of fly's eye lenses. More particularly, as shown in FIG. 3A, an image of an object is recorded on a photographic plate 16 through the fly's eye lens 14 while the camera is moving. The fly's eye lens 14 is a rectangular array of lenses (each resembling a section of a sphere) such that, in addition to the plurality of lenses shown vertically in FIG. 3A, the array also extends horizontally (or into the page as shown in FIG. 3A). During playback, the photographic plate is illuminated from behind and, for a particular viewer position, the viewer will only see the view or image seen by the camera at that particular instant or point. Thus, the viewer sees a stereo pair which is different at different vantage points, such that both horizontal and vertical parallax is provided. Even though both horizontal and vertical parallax are provided, the fly's eye approach has the shortcoming in that it is difficult to produce or simulate electronically, since the display must be able to display both horizontal and vertical parallax information simultaneously.

Other types of three-dimensional simulations can include shutter goggle displays in which the user wears glasses containing polarizing screens or shutters, with the shutter for the left eye acting as a barrier for images intended for the right eye and vice versa. An extension of the shutter goggle technique is the provision of a head mounted display in which a small television monitor is provided for each eye, with head position sensing devices provided on the helmet such that the image provided to each eye varies as the position of the head varies. Such systems are utilized today in virtual reality systems which are becoming particularly popular in arcades.

Another approach to forming dimensional images involves formation of a hologram. Forming a holographic display typically involves forming an image on a holographic plate by dividing a single laser beam into two components, one of which falls directly upon the holographic plate while the other is reflected from the object and then onto the holographic plate. Referring to FIG. 4, in recording a hologram, a coherent source of light such as laser 20 provides a light beam which is first reflected by a mirror 22 and then a beam splitter 24 splits the beam into first and second component beams represented at 26, 28. The first beam 26 is then reflected by another mirror 30 and then impinges directly upon the holographic plate 32. The second beam 28 is directed toward the object 36 via mirror 34, and the beam is diffusely reflected (represented by wavefronts 38) and impinges upon the holographic plate 32. As would be understood by one skilled in the art, spatial filters F are also provided for "cleaning" the light source and controlling the size of the beam since it progressively enlarges or propagates as it leaves the filter. The object beam and reference beam thus interfere with one another within the holographic plate and form an interference pattern which accurately documents the wavefronts present during the recording process.

FIG. 5 illustrates an arrangement for viewing or reconstructing the image formed on the holographic plate 32. More particularly, a laser 20 provides a beam via mirrors 40, 42, 44 which then illuminates the holographic plate 32 such that the observer 46 sees a reconstructed virtual image 48. The holographic plate 32 has recorded the interference pattern (i.e., as formed in FIG. 4) as a variation in the intensity of the plate's density, and thus can be illuminated and viewed by a monochromatic light source provided by the laser 20 which is then viewed by the observer 46 on the opposite side of the holographic plate 32.

If the reconstruction light source is not monochromatic, for example if a white light is utilized, a "smeared out" reconstructed image is formed as shown in FIG. 6. For each wavelength of light in the reconstruction beam, a different image is reconstructed, with three images shown in FIG. 6 corresponding to red, green and blue reconstructed images 50, 52, 54 resulting from the white light source 56. The observer 46 sees the different images as appearing at different locations, and include rotation, size and distance aberrations which are related to the wavelength difference between the recording light source and the respective wavelengths of the reconstruction beam.

FIG. 7 illustrates an arrangement for forming white light viewable holograms, which are typically found on credit cards. Initially, a master hologram is formed on a holographic plate 32 in the manner described earlier. The holographic plate 32 is then illuminated by a beam identical to its original reference beam provided by laser 20. The laser 20 also provides a reference beam to a second holographic plate 33. Thus, the laser 20 provides a reconstruction beam via mirrors 60, 62, 64 and beam splitter 61 such that the reconstructed real image of holographic plate 32 is illuminated and falls upon the second holographic plate 33. The laser 20 simultaneously provides a reference beam via mirror 60 and beam splitter 61 thereby providing a reference beam to the second holographic plate 33 such that a second hologram is formed. The image formed 35 appears to straddle the holographic plate 33 and, when viewed by a monochromatic light source, the image appears to be surrounding the plate 33. For objects having little depth, white light illumination results in a slightly fuzzy pastel holographic image.

In a rainbow hologram (a type of white light viewable hologram), a transfer is made from an original hologram to a second holographic plate as shown in FIG. 7, however only a slit of the original hologram (32) is allowed to illuminate the second holographic plate 33. Confinement of the illumination to a slit is achieved either by utilizing a slit beam produced by a cylindrical lens, or by masking the first holographic plate 32. As a result, illumination of the second holographic plate 33 not only reconstructs the image formed on the plate 33, but also reconstructs the slit in space. As shown in FIG. 8, when this type of hologram is reconstructed using white light 56' to illuminate the second holographic plate H2, a plurality of reconstructed images are formed, for example as shown at 65, 66, 67, corresponding to red, green and blue reconstructed images. Each of the reconstructed images will have the slit S therein such that the viewer must view the recorded object from an angle/position in which all three of the slits are aligned. If viewed from a position in which the slits are not aligned, the object image will not be visible. Thus, the rainbow hologram approach overcomes the diffusion or "smearing out problem" (FIG. 6) by providing a slit which requires the viewer to be at the properly aligned position to view the object image. Since the image is lost if the vertical relationship between the viewer and the holographic plate changes, this approach does not provide vertical parallax. However, the vertical parallax is traded for the ability to view the hologram by white light using the slit.

FIG. 9 illustrates another method in which a white light visible hologram is produced. As shown in FIG. 9, a first hologram or master hologram 75 (e.g. corresponding to the first hologram 32 of FIG. 7) is transferred onto a second holographic plate 77 as it is illuminated by the reconstruction beam emanating from laser 20 and passing through mirror 74, beam splitter 76 and mirror 78. However, the reference beam for the secondary hologram 77 falls on the opposite side of the holographic plate 77 via mirrors 70, 72 (in contrast to the FIG. 7 arrangement in which the reference beam and the image from the first holographic plate are directed upon the same side of the holographic plate). As a result, an interference filter is created in the secondary holographic plate 77, with the plate 77 also having a diffraction pattern which characterizes the object. Thus, the holographic recording also includes a monochromatizing interference filter, and the image is reconstructed by Bragg diffraction. A hologram which is formed in the method shown in FIG. 9 can be illuminated by white light and the internal interference filter filters out all but one wavelength (or a narrow band of wavelengths) which is used to reconstruct the image for the observer. The reflection transfer hologram thus produces images which are monochromatic, however the image maintains vertical parallax.

The foregoing various types of holograms have a severe shortcoming in that the object must be small, still, and insensitive to vibration. Thus, holograms of live and moving objects are difficult to produce. In addition, the object must be a real object from which the hologram is produced, and simulated images or data cannot be formed into a hologram utilizing the real-object technique. To overcome these shortcomings, a holographic stereogram technique has been developed as shown for example in FIG. 10. In this arrangement, a series of stereo pairs are recorded on 35 mm film. Subsequently, the film 80 having a series of stereo pairs thereon) is recorded frame by frame on the holographic plate utilizing the reference beam 82 and the image beam 84 passing through the film 80, lens 86, diffusing screen 88 and then onto the holographic plate 90. A series of the small strip holograms are produced on the master 90 each having the height of the plate, but only 3 mm wide as indicated by the slit S. Each strip hologram is a different view of the diffusion screen, with each exposure corresponding to a different frame of the 35 mm motion picture film which is projected onto the diffusion screen. The individual strips S are 3 mm which corresponds to approximately one pupil diameter, and each pair of strips which are 65 mm apart (inter-ocular spacing) constitute a stereo pair visible for a particular vantage point of the viewer. The holograms formed on plate 90 are then transferred to a second hologram or viewable hologram (not shown) in the manner shown in FIG. 9.

In viewing the viewable hologram of the FIG. 10 arrangement, the observer is looking into the reconstructed slits of the hologram 90, with each individual slit having the image projected on the diffusion screen (i.e. from the film) when that particular slit was recorded. The two slits 65 mm apart (corresponding to inter-ocular or inter-pupil spacing) each carry the respective left/right image of a stereo pair, and thus the observer sees a free-viewing stereo image. A very high frequency ($10^3$ lp/mm or line parts/mm) holographic grating is generated by the holographic stereogram arrangement of FIG. 10, with the holographic grating only utilized as a beam steering mechanism for a relatively low frequency (1 pixel/mm) photographic image. The sequence of stereo pairs may be produced by a number of methods, for example by a stereoscopic motion picture camera or by rotating an object (recorded by a standard camera lens or even under an electron microscope) or by computer simulation of three-dimensional models.

Referring now to FIG. 11, a multiplex hologram is shown which, like the holographic stereogram arrangement of FIG. 10, can utilize photographic film footage for recording the holographic images. However, instead of recording a set of slit holograms taken from a diffusion screen as shown in FIG. 10, in the multiplex hologram arrangement, each slit hologram recording is a single photographic frame recorded through a cylindrical lens. Thus, each frame of the film 91 (FIG. 11) includes an image recorded through a cylindrical lens with each frame forming a slit hologram on the plate 92 as the image beam 94 passes through the film 91, lens 98 and onto the holographic plate 92, while the reference beam 96 simultaneously falls upon the plate 92. As a result, a display is formed which is similar to the lenticular display discussed earlier, with the holographic display similar to a sequence of cylindrical lens images (with the lenses of FIG. 11 extending orthogonally as compared with the FIG. 2 arrangement).

The foregoing arrangements are based upon the use of amplitude holograms or, in other words, the final fringe patterns are set up as variations in the amount of opaque silver in the film or holographic plate. As a result, most of the incident reconstruction beam is attenuated by the silver film and the diffraction efficiency of the hologram is on the order of a few percent. Typically, most holographic systems utilize phase variation. In the photographic domain, the holographic plate is first processed in normal silver chemistry. The final pattern includes the distribution of silver/no silver regions, with the silver sites re-halogenated to silver halide.

The result is a phase hologram in which the entire holographic effect is obtained by refraction of light and the changes of the index of refraction due to the silver-halide/no-silver-halide variation in the film emulsion. With photopolymer materials, the phase hologram is obtained directly (i.e., without the halogenation).

Although the foregoing arrangements attain dimensional images with differing degrees of success, the major drawback of such devices is that the image is substantially fixed on the holographic plate. As a result, the images cannot be modified or updated with time. Thus, in a situation in which it is desirable to display a sequence of events, the sequence is limited by the number of frames which may be stored on the hologram through the slit arrangement, for example in either the holographic stereogram or the multiplex hologram arrangements. Moreover, the time delay associated with recording and reconstruction makes such arrangements incapable of producing real time images. In addition, different arrangements suffer from the inability to provide full vertical and horizontal parallax, and/or in the ability to display true color of the object being displayed. Accordingly, a holographic three-dimensional display is needed which is capable of full horizontal and vertical parallax, and which can display images in true color. Furthermore, such a display should be able to be modified or updated to sequentially produce images for different objects, or a sequence of images of a particular object or subject matter which varies with time.

SUMMARY AND OBJECTS OF THE INVENTION

Accordingly, it is an object of the present invention to provide a holographic three-dimensional display which produce images in true color and which provides at least full horizontal parallax (i.e., provides a series of different images for different vantage points disposed horizontally) and optionally full vertical parallax.

It is another object of the present invention to provide a holographic three-dimensional display device which can successively produce new images or successively update an image which changes with time.

It is yet another object of the present invention to provide an electro-optical display which is capable of displaying a plurality of images simultaneously with a high degree of resolution, with the different images visible from different orientations of the viewer with respect to the display.

It is a further object of the present invention to provide a display device which can be updated on a real time or near real time basis, with the display operated by solid state electronics which are associated with the display screen.

It is a still further object of the present invention to provide a display device which only requires power and ground wiring, with the image information provided to the display device through photosensors.

It is another object of the present invention to provide a display device in which an electro-optical material is controlled by a plurality of electrodes which are associated with integrated circuit or semiconductor devices, with the integrated circuit devices processing image signals which are to be displayed by the electro-optical material.

It is yet another object of the present invention to provide a display device which is capable of communicating with a plurality of other display devices or computers simultaneously, and which is able to simultaneously send different information to display devices at different locations simultaneously.

It is yet another object of the present invention to provide a display device which includes a processor for determining the diffraction grating or pattern necessary for displaying a plurality of perspective images, with the diffraction grating then induced by the display device.

Another object of the present invention resides in the integration of the computing and display functions allowing a high density of display elements without prohibitive wiring and/or interface complexity.

These as well as other objects and advantages are attained in accordance with the present invention which provides an electronic holographic display. More particularly, the present invention provides an electro-optical display device which is intimately integrated physically with solid state electronics for sensing data and computing the hologram. Like the stereogram approach, the high frequency holographic grating is utilized as a beam steering device. The computed information is thus much lower, and similar to that of an animated film sequence. As a result, a high resolution image can be displayed (i.e. with resolution at least on par with a high quality conventional television), and the image can be updated on a real time or near real time basis. In addition, computer animation/graphics techniques such as ray-tracing, tiling and radiosity techniques can be utilized to generate the image at a significantly reduced computational complexity.

It cannot be overstated that a significant aspect of the present invention resides in the integration of traditional computer graphic techniques with diffractive optic calculation to determine a plurality of images (i.e. corresponding to images observable at different vantage points with respect to the display), with the display providing the requisite grating to yield the plurality of images as visible from the plurality of vantage points. Although the display of the present invention does not function as a filter/lens as in an actual hologram, it need only display the plurality of views to a plurality of vantage points. As a result of the computational simplification, images can be displayed on a real time or near real time basis with resolution as good or better than a good quality television. In addition, any computations necessary in creating an image or image information can be performed by a processor of the display, or by an external computer, with the information transmitted to the display optically, and with the computer chips of the display then directly writing a diffraction grating in the electro-optical material of the display.

Although the holographic fringe pattern to be induced or formed in the liquid crystal material can be ascertained by direct mathematical modeling of wavefront interference, it is more preferable to form the pattern based upon decomposition of the grating into two parts. The first will utilize standard computer graphic rendering techniques to produce a series of two dimensional projections identical to that used by the holographic stereogram approach. These calculations are data set dependent (they depend on the picture) and must be re-computed in detail for every picture. The second part utilizes wavefront interference calculations based on a diffusion screen at a fixed position relative to the display device. The second part calculations need be done only once per device geometry. Thus, although the second part calculations are time consuming, they need be done only once per holographic display system. Therefore, the result of the second part type calculations can be encoded in tables and generator functions, thereby enabling fast computation of the holographic fringe patterns.

In a simplified version, the display will operate in a horizontal parallax mode, in a manner similar to the lenticular photographic or multiple hologram approaches. Vertical parallax can also be added such that the display operates in a manner similar to the operation of a reflection hologram. Full, true color can also optionally be provided.

BRIEF DESCRIPTION OF THE DRAWINGS

A more complete appreciation of the invention and the many attendant advantages thereof will be readily attained from the following detailed description, particularly when considered in conjunction with the drawings in which:

FIG. 19 schematically illustrates a RAM cell having a photodetector;

FIG. 20 is a flow-diagram of the overall operation of the display device of the present invention;

FIGS. 21–23 illustrate the use of transparent electrodes (FIGS. 22–23) as compared with metal electrodes (FIG. 21);

FIGS. 24A-B illustrate the distinction between a True Reflection Hologram (FIG. 24A) and a Transmission Hologram (FIG. 24B) provided by the present invention;

FIG. 25 shows a modified form of the present invention which includes a waveguide such that the display can be edge-lit;

DESCRIPTION OF THE PREFERRED EMBODIMENTS

The present invention draws upon selected concepts relating to holography and stereogram approaches for providing dimensional images. However, in accordance with the present invention, the marriage of integrated circuitry and electro-optical displays provides an improved holographic, three-dimensional display which provides varying images as the viewer changes position with respect to the display, with the display also able to be substantially continuously updated on a real time basis. The display can provide a full color three-dimensional image with both vertical and horizontal parallax. The display draws upon the stereogram concepts in that a different image is provided for each eye thus giving the viewer the perception of depth. In addition, the display draws upon the concept of holography in that the application of a voltage to the electro-optical material changes the index of refraction of the electro-optical material such that when the display is illuminated, different images appear as the viewer changes position.

Figure 12:
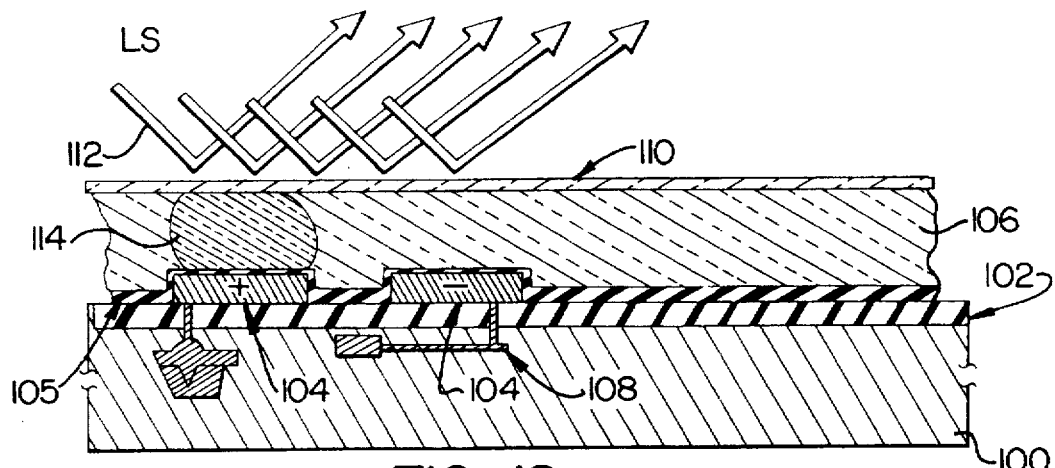
FIG. 12 illustrates a side cross-sectional view of a display device in accordance with the present invention.

Referring to FIG. 12, a simplified representation of a portion of the display device in accordance with the present invention is depicted. As discussed above, an important concept of the present invention resides in the combination of integrated circuit and electro-optical display technology. The display includes a processor level 100 which includes a substrate having the image processing and driving circuitry formed therein. The processor level typically includes a silicon very large scale integrated circuit (VLSI) having the various computational and drive circuitry formed therein, for example by doping of the top layers of the semiconductor. Above the processor level is a passivation layer 102 which provides a separation between the processor level 100 and a plurality of electrodes 104. Although only a pair of electrodes 104 are shown in FIG. 12, as will be discussed in further detail hereinafter, the display includes numerous electrodes disposed throughout substantially the entire area of the display.

Above the electrodes in FIG. 12, is an electro-optical layer 106, with an additional passivation layer 105 separating the electro-optical layer 106 and the electrodes 104. The electro-optical material can be, for example, a liquid crystal layer, however it is envisioned that other electro-optical materials may be more suitable, particularly as superior electro-optical materials are developed. Suitable electrical connections are also provided as represented generally at 108 for interconnecting the electrodes 104 to the processor level 100 such that a voltage can be applied to a desired pattern of electrodes at a desired time. The connections 108 are formed by masking, etching and filling techniques which are known.

As discussed earlier, the display draws upon concepts of holography in that different images can be produced as a result of changes in the index of refraction to form a diffraction grating in the display material. More particularly, as different electrodes are selectively supplied with a voltage, the electro-optical material will change its refractive properties, thus changing the angles at which the illuminating light travels through and is reflected from the electro-optical material. The image which a viewer sees from any given position is a summation of the effects of the illuminating light. Since the activation of selected electrodes changes the refraction pattern, different images are observable for different perspectives of the viewer with respect to the display. Thus, a plurality of different images can be provided for a plurality of respective vantage points by: (1) determining the different images, and (2) calculating the diffraction grating or diffraction pattern to be created by the electrodes and the electro-optical materials which is necessary for each image to be visible at a respective vantage point. Calculations, or determination of the gratings can be performed in the processor layer, or can be performed, by an external computer and then communicated to the processor layer (e.g., through photosensors as discussed hereinafter).

Although the holographic fringe pattern to be induced or formed in the liquid crystal material can be ascertained by direct mathematical modeling of wavefront interference, it is more preferable to form the pattern based upon decomposition of the grating into two parts. The first will utilize standard computer graphic rendering techniques to produce a series of two dimensional projections identical to that used by the holographic stereogram approach. These calculations are data set dependent (they depend on the picture) and must be re-computed in detail for every picture. The second part utilizes wavefront interference calculations based on a diffusion screen at a fixed position relative to the display device. The second part calculations need be done only once per device geometry. Thus, although the second part calculations are time consuming, they need be done only once per holographic display system. Therefore, the result of the second part type calculations can be encoded in tables and generator functions, thereby enabling fast computation of the holographic fringe patterns.

Referring still to FIG. 12, a light source represented generally at LS provides light which impinges upon the display device, with the incident light bouncing back to be viewed by the viewer as indicated by the large arrows 112. It is important to note that the arrows 112 are provided merely as a representation and do not correspond to actual light paths. The outer surface of the display includes a transparent electrode provided on a clear cover such as a glass cover as represented at 110. Although not shown, it should be readily appreciated that the passivation layer 105 and cover 110 also act as orientation devices to provide the liquid crystal electro-optical material with an initial orientation (with the orientation then changing upon application of an electric field). Typically, the initial orientation function is accomplished mechanically by scratch patterns in the layers 105, 110, however chemical orientation methods are also known.

When a voltage is applied between an electrode 104 and the electrode of the transparent cover 110 (or between adjacent electrodes), the voltage causes a refractive change in the electro-optical material. For example, in a liquid crystal material, the application of a voltage causes a change in the orientation of the crystals as represented schematically by the different hatching at 114. As a result, the index of refraction in the area 114 also changes. Thus, by providing a large number of electrodes throughout the display, a refraction pattern is induced by the electro-optical material such that the light source can reconstruct a plurality of virtual images for different vantage points of the viewer(s).

The change in the electro-optical material is accomplished by application of a voltage across the thickness of the material (i.e. from electrode 104 to cover 110 as illustrated by the "+" associated with the left electrode 104 and the "−" associated with the cover). However, in the future, it may alternatively be desirable to form a diffraction grating by applying a voltage across adjacent electrodes as depicted by the "+" associated with the left electrode 104 and the "−" associated with the right electrode 104. In FIG. 12, it can be seen that left electrode 104 and right electrode 104 are mounted in a plane which is parallel to a plane containing cover 110. Moreover, typically cessation of the applied voltage causes the electro-optical material to relax or assume the original orientation. However, in order to increase the display speed, it is more desirable to provide an active driving force to return the material to its original position since, particularly with known liquid crystal devices, the relaxation time is much longer than the response upon application of a voltage. Thus, an additional electrical driving force may also be provided for re-orienting the electro-optical material to its original position.

It is important to note that the electrodes 104 are extremely small, and thus the effect of a single electrode as shown at 114 would not be visible to the naked eye. However, the summation of the effects of numerous electrodes can be clearly visible to the naked eye. The summation of the effects of the electrodes throughout the display provide the viewer with a particular image. As the viewer moves from one position to another with respect to the display, a different summation of the effects of the plurality of electrodes will be received by the viewer and thus a different image is produced (or reconstructed).

Figure 13:
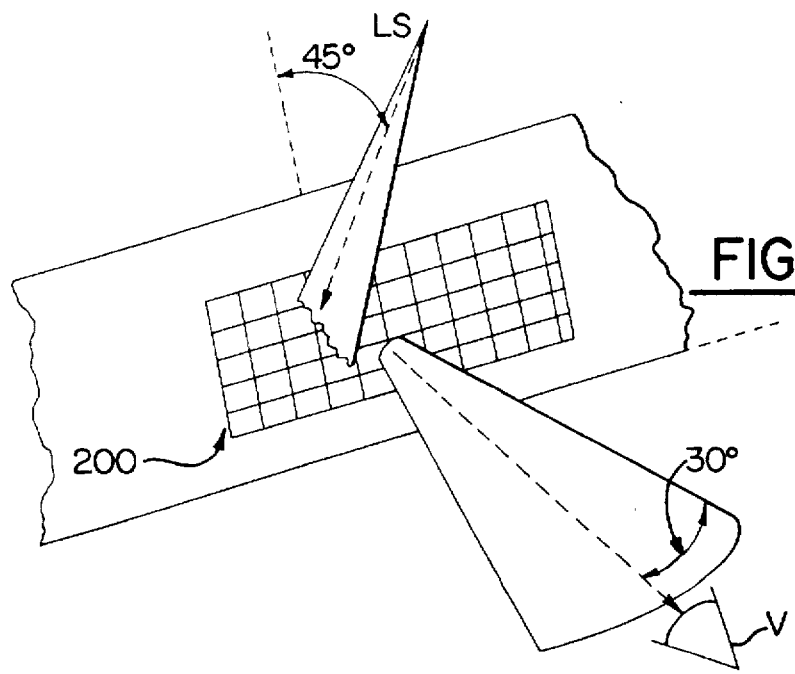
FIG. 13 provides a schematic representation of the display device in accordance with the present invention in operation.

Referring to FIG. 13, a generalized overview of the display device is shown. A light source LS (which could be coherent or incoherent) is provided at a predetermined distance and angle with respect to the display, with the positioning of the light source shown at an angle of approximately 45 degrees with respect to the plane of the display 200. As the light source bounces off the display, the image seen by the viewer V will depend upon the pattern of voltages applied at the electro-optical material by the electrodes. In addition, as the observer moves his/her head, a different summation of the effects of the incident light will be observed by the viewer which corresponds to changing aspects of the depth of the image or the objects displayed in the image. Thus, a dimensional image is provided with the observer seeing different aspects or dimensions of the image as his/her vantage point changes with respect to the display such that horizontal and vertical parallax can be provided. The viewer would normally be positioned at a distance of approximately 0.5 meters from the screen, however this distance could be varied with the positioning of the light source coordinated with the position of the viewer. If the viewer is positioned at a distance which greatly differs from the designed distance, the image may become somewhat distorted.

The light source may be a single color light source with the resulting display monochromatic. A white light source may also be used to form an achromatic hologram or a full-color hologram with no vertical parallax. To provide color, the light source can take the form of a plurality of different color monochromatic light sources which sequentially illuminate the display. More particularly, red, green and blue monochromatic light sources may be provided which sequentially illuminate the display with the electrodes corresponding to parts of the display having the respective color components sequentially activated in timed relation with the sequentially activated light sources. For example, if the display consists of a man having a red shirt and blue pants, the electrodes corresponding to the red shirt would be activated in timed relation with the activation of the red light source, while the electrodes responsible for the image of the pants would be activated in a timed relation with the activation of the blue light source. Similarly, if an image included a man having a shirt which is a shade having red and green components, electrodes which form the shirt image would be activated during the activation of both the red and green lights (although the set of electrodes activated during the activation of the red light would not necessarily be exactly the same as the set of electrodes activated during the activation of the green light).

Although the plurality of monochromatic light sources are activated sequentially, the speed of the change from one monochromatic source to another Is sufficiently rapid that it would not be noticed by the human eye. For example, the shifting from one light source to another may occur every 0.001 seconds such that the images produced by the different component light sources would appear to be simultaneous and continuous to the viewer.

Figure 14A:
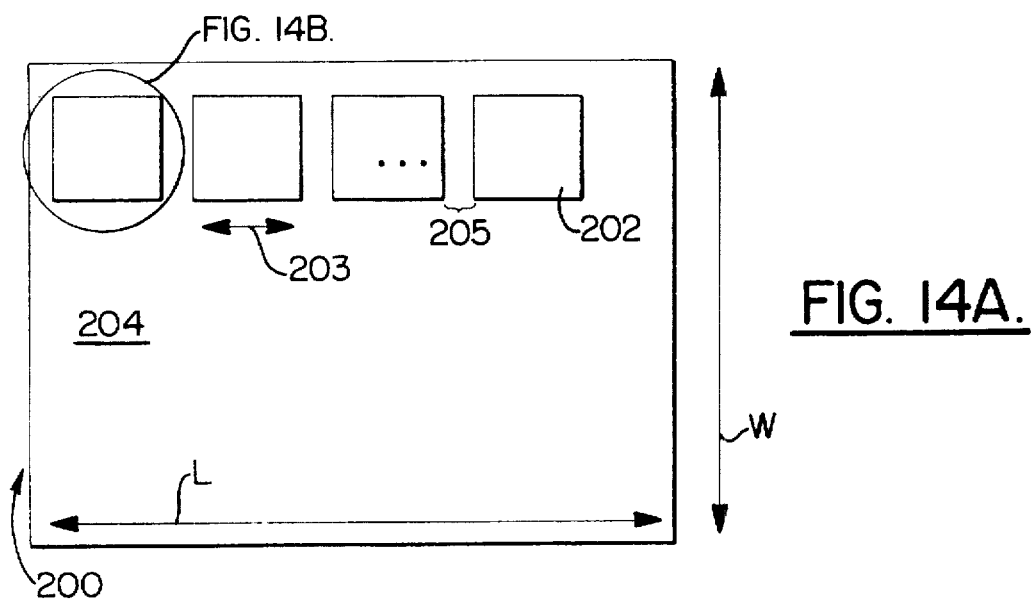
FIG. 14 illustrates the elements and subelements which form the display device in accordance with the present invention.
Figure 14B:
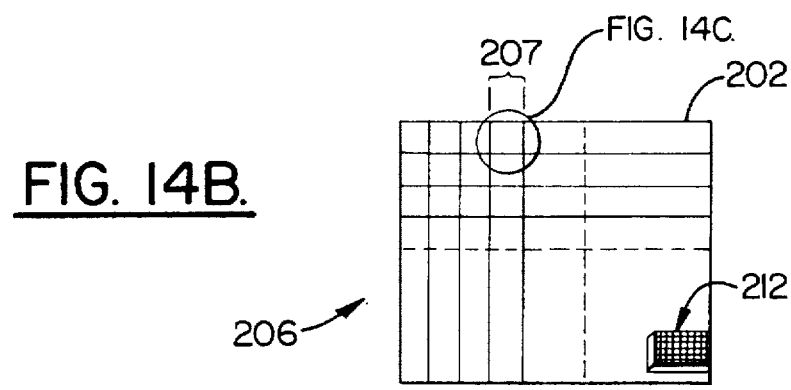
Figure 14C:
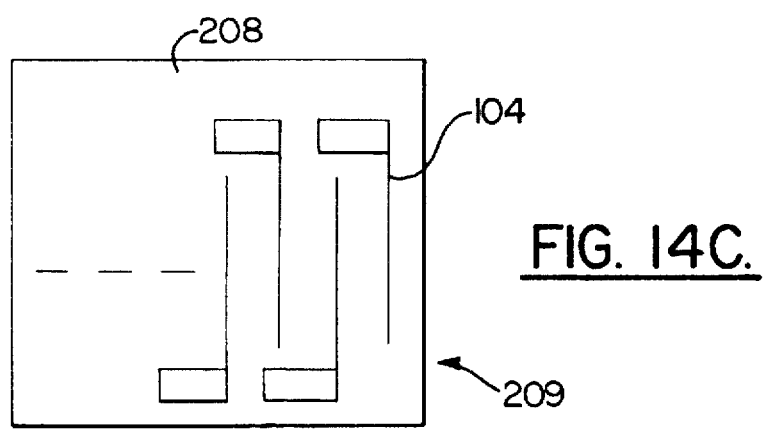

Referring now to FIG. 14, an overview of the various elements and sub-elements of the display will become more readily apparent. By way of example, a display 200 will be described having approximate length L and width W dimensions of 20 cm×20 cm, however displays of a variety of sizes could also be formed. The display 200 will include an array of integrated circuit devices, more particularly very large scale integrated (VLSI) circuit devices, which we will refer to as die 202. Each die 202 is a square having a side dimension 203 of 10,000 μm, or in other words the die would be 1 cm×1 cm squares. The dies can be mounted in a multichip module 204 which is a waffle-shaped chip mounting device having a plurality of square craters for receiving each of the die.

Most conventional multichip modules are adapted to receive chips with their electrodes facing downwardly such that they are electrically interconnected. However, a multichip module for use in the present invention is adapted to receive the dies with their electrodes exposed or facing outwardly such that the electrodes can be utilized in operating the liquid crystal device as discussed earlier with reference to FIG. 12. The multichip module currently manufactured mounts the dies 202 with a spacing 205 of approximately 100 μm. A spacing of 100 μm is a borderline size of that which can be detected by the naked eye, and therefore a very fine grid pattern may be visible upon the screen. It is hoped that the spacing will be reduced to approximately 50 μm such that the spacing has no visible affect to the viewer.

With each of the die having a dimension of approximately 1 cm×1 cm, a 20 cm×20 cm display will therefore include a 20×20 array of 400 die. One significant aspect of the present invention resides in the advantageous use of the individual die which together form the display, since it is only necessary to manufacture a perfect integrated circuit device of 1 cm×1 cm. Typically, the silicon semiconductor devices or integrated circuit devices are manufactured as wafers which include a number of 1 cm×1 cm parts with the wafers then cut to form the individual die. However, even at the 1 cm×1 cm size, a certain percentage of the dies are defective (for example 10%) and must be discarded. Without utilizing an array approach, the formation of a relatively large display without defect would be practically impossible with present manufacturing processes. Thus, in accordance with the present invention, a display of 20 cm×20 cm will include 400 of the 1 cm square die 202. Once assembled into the multichip module, the layer of electro-optical material is disposed over the array of die in the multichip module, with the glass cover and transparent electrode provided over the electro-optical material.

Still referring to FIG. 14, the structure of each individual die will now be discussed in more detail. One of the die 202 is shown in a first enlarged view 206 in FIG. 14. Each die 202 will include an array of smaller sub-elements which we will refer to as hoxels, each square having side dimensions of 1000 μm or 1 mm as indicated at 207. Thus, each die 202 will include a 10×10 array of hoxels, each 1 mm×1 mm. Each die will also include a small photodetector 212 (approximately 25 μm) which is invisible to the naked eye, the purpose of which will be explained in more detail hereinafter. Each hoxel 208 will in turn include a plurality of electrodes 104 as shown by the further enlarged view 209. The electrodes 104 are responsible for forming the image in the display as they apply a voltage across the electro-optical material as discussed earlier in conjunction with FIG. 12.

As mentioned earlier, each die preferably includes a photodetector 212. In order to reduce the amount of required hard wiring, the photodetector receives the image information such that only power and ground wiring is necessary for the display. The photodetector is actually formed as part of the processor layer which is capable of receiving coded light information and provides the information to the processor. A hole is formed in the layers directly above the photodetector portion of the processor layer (for example by known processes such as masking and etching), to provide a path for the incoming light. Since the electro-optical material is transparent, it will not disturb the receipt of light by the photodetector 212. The image information is thus supplied to the photodetector, with the image information light signal similar to that utilized in fiber optics transmissions. Preferably, a common signal may be provided to each photodetector 212 of each die, although the reactions of each die would be different (e.g., as a result of the information coding) as should be readily understood. However, it would also be possible to provide a different signal to each of the respective photodetectors, and this may become desirable particularly where the complexity of the image signals increase.

The combined abilities of the present invention to receive information optically, and to display a plurality of images to a plurality of respective vantage points make the display particularly suitable for use in computers which "talk" to each other. More particularly, the photodetector can receive information from a predetermined source which may be another computer display. In addition, the display in accordance with the present invention could also communicate with one or more displays simultaneously by virtue of the ability to display a plurality of images or light information signals to a plurality of vantage points simultaneously.

Figure 15:
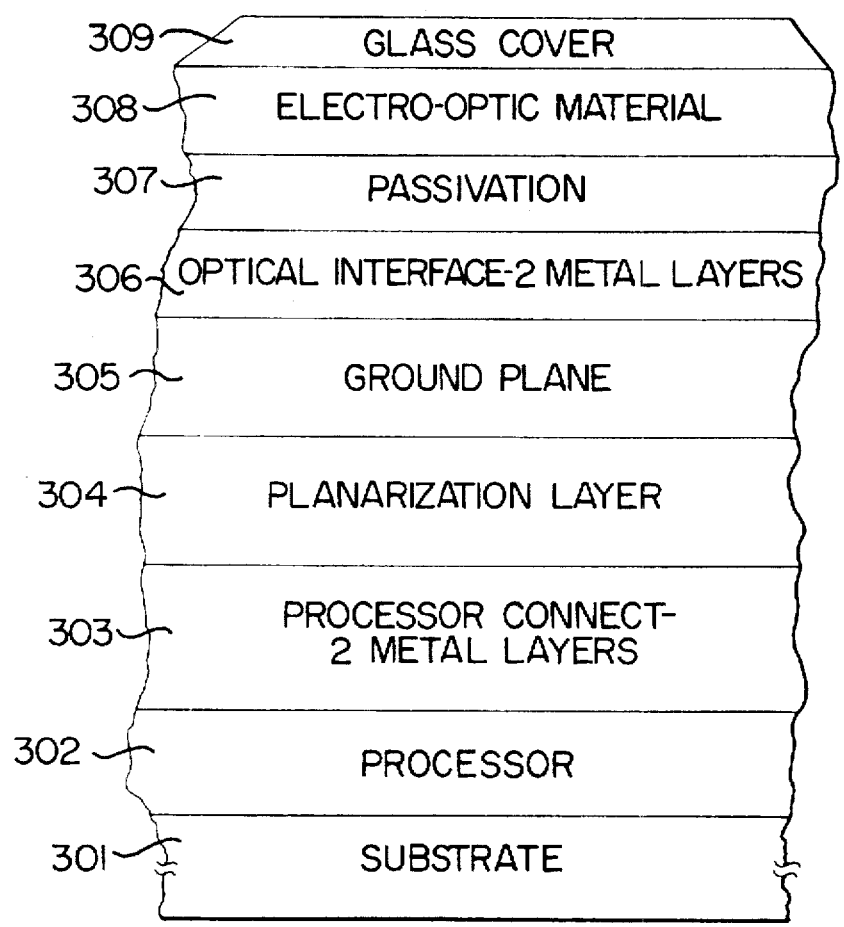
FIG. 15 is a side view illustrating the various layers associated with the display device of the present invention.

FIG. 15 shows a representation of the various layers of the display. For illustrative purposes, the multichip module is not shown in FIG. 15, and FIG. 15 merely provides an illustration of the relationship between the various layers of the VLSI die and the electro-optical display. The die 202 will each include a substrate layer which provides the structural integrity of the die and typically would be formed of silicon with the processor layer 302 formed in an upper layer of the silicon substrate 301 by known processes such as doping. Above the processor layer 302, a processor connect layer 303 is provided which is formed of two metalized layers. The processor connect provides an interconnection between the various circuits of the processor layer 302. The processor connect layer 303 includes two metal layers, one responsible for providing horizontal connections, the other responsible for providing vertical connections as would be readily understood by one skilled in the art.

Above the processor connect layer 303, a planarization layer 304 is provided which, as the name implies, acts as a leveling mechanism such that a planar surface is provided atop the planarization layer. Ground plane 305 is provided above the planarizational layer 304, with the optical interface layer 306 formed above the ground plane. The ground plane 305 may be optional, however it is included to ensure that any voltages in this processor connect layer do not stray to the electro-optical material and distort the image. The optical interface layer includes two metal layers to thereby provide the electrodes 104 as discussed earlier with reference to FIGS. 12 and 14. Although the electrodes were depicted as a single layer for illustrative purposes in FIGS. 12 and 14, there will actually be two layers of superposed electrodes in the optical interface layer as discussed hereinafter. Above the optical interface 306, a passivation layer 307 is provided.

Each die 202 (as discussed in conjunction with FIG. 14) will include the layers 301–307. After the die are formed and mounted in the multichip module, an electro-optical material 308 is provided over the array of die and covered by a cover layer 309 which includes a glass or other transparent cover together with a transparent electrode. It is hoped that improved electro-optical materials will be developed for improved display response times. Currently, nematic or twisted nematic crystals are desirable since they produce the largest change of image refraction in response to electrical fields. Although ferroelectric liquid crystals respond more rapidly than nematic liquid crystals, they are not as sensitive to electrical fields.

Figure 16A:
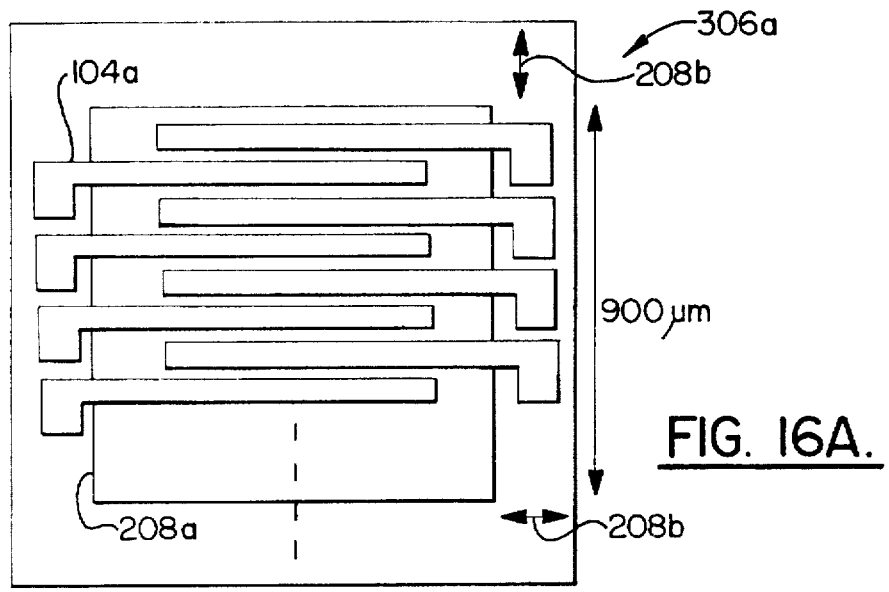
FIGS. 16A and 16B illustrate electrode arrangements for applying a voltage to an electro-optical layer.
Figure 16B:
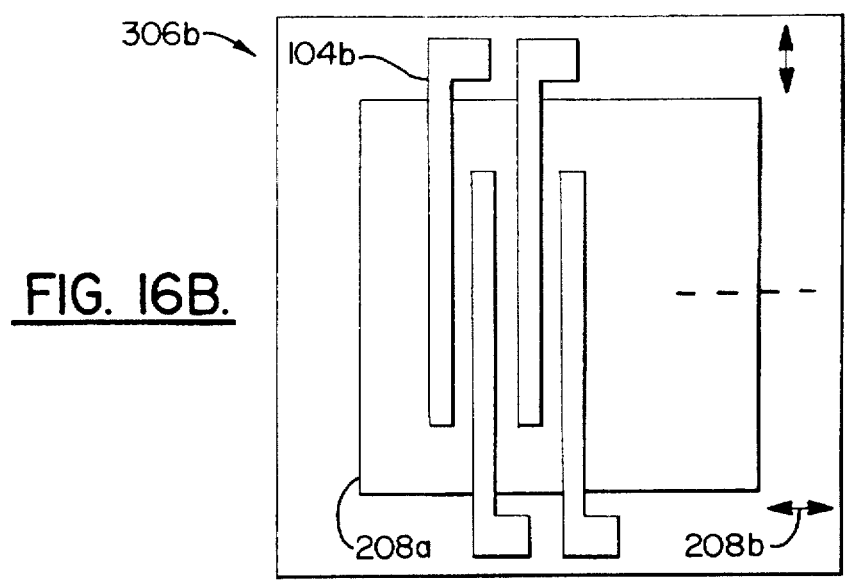
Figure 16C:
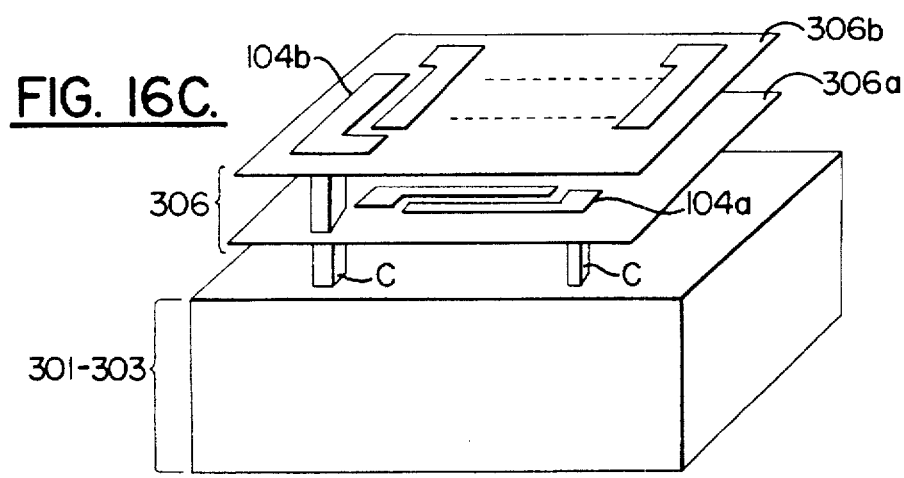
FIG. 16C shows an exploded perspective view, illustrating the relationship between the electrodes of FIGS. 16A and B and the silicon processor.

As discussed above, the optical interface layer (which provides the electrodes 104 for applying a voltage across the electro-optical material) is actually formed of two layers as will be readily apparent with reference to FIGS. 16A–16C. FIGS. 16A and 16B each depict a different layer of the optical interface layer 306, with the area shown in each of FIGS. 16A and B corresponding to the size of one hoxel (i.e., which would be 1 mm utilizing the dimensions discussed with reference to FIG. 12 for example, and shown it the view 209). The electrodes are responsible for forming the images of the display, with the operating area of the hoxel formed as a square patch having a side dimension of approximately 900–950 μm in the center of each hoxel.

FIG. 16A illustrates the vertical metal layer 306a of the optical interface 306 (FIG. 15). The vertical layer will include a series electrodes 104a arranged in a row which extends vertically. The electrodes will provide a center operational area of each hoxel 208, with the center operational area represented by the box 208a for illustrative purposes. The border or margin area 208b has a dimension on the order of 25–50 μm; such that the center patch area 208a is a square of approximately 900–950 μm. The margin area 208b allows for interconnection of the electrodes to the processor layer (as was depicted at 108 in FIG. 12) to apply a voltage to the electrodes 104a. The margin can also accommodate a hole for the photodetector as discussed earlier. The other layer of the optical interface is shown in FIG. 16B as the horizontal layer structure 306b. As with the vertical layer, the horizontal layer 306b (FIG. 16B) will include a plurality of electrodes 104b which form a center active area 208a, with a margin area 208b provided for interconnection of the electrodes with the silicon processor. However, the electrodes of the horizontal layer 306b are disposed orthogonally with respect to the electrodes of the vertical layer 306a. It is to be understood that the size of the electrodes in FIGS. 16A and B are greatly exaggerated with respect to the size of the hoxel. The electrodes will actually be on the order of 0.5–1.0 µm in thickness and 900–950 µm in length, with each hoxel having on the order of 450 or more electrodes in each of the vertical and horizontal optical interface layers 306a, 306b.

The horizontal and vertical metal layers or electrode layers are superposed above the silicon processor and beneath the liquid crystal layer. More particularly, as shown in FIG. 16C, each hoxel will include the silicon processor (301–303) which operates the optical interface layers 306 via connections C which extend from the silicon processor to the border or margin area (208b, FIGS. 16A–B) of the optical interface layers 306. The horizontal electrode layer 306b superposes the vertical electrode layer 306a as shown in FIG. 16C, however, it is believed that a reversed arrangement would be as effective.

Thus, in the 20 cm×20 cm sample size display, an array of 400 die will be provided beneath an electro-optical material, with each die including a 10×10 array of hoxels having vertical and horizontal electrode layers 306a, 306b for operating the electro-optical display. Clearly, application of a voltage to only 1 electrode would have an effect which is undetectable to the human eye, however the summation of the effects of a large number of selected electrodes will reconstruct a virtual image when illuminated by a light source LS (FIG. 13). In addition, as a result of the diffraction grating which is induced by the application of a voltage to selective electrodes, a different image appears as the viewer turns his/her head or changes position, since a different summation or accumulation of the effects results upon illumination of the display by the light source LS. In addition, the summation will also be different for each eye of the observer, thus giving the observer a stereo pair and the appearance of depth in the image being observed.

Considering a viewer at a position of 0.5 m from the screen with a viewing angle of ±30 degrees. Currently, the viewing angle of ±30 degrees from the center position (i.e. as depicted in FIG. 13) is limited by the size of the electrodes of approximately 0.5–1 µm which in turn limits the resolution of the image and the ability to bend the light by the diffraction grating induced in the electro-optical material. However, as manufacturing techniques become more sophisticated and electrode sizes become smaller, larger viewing angles may be possible. In any case, over a ±30 degree viewing angle, a viewer might see at most 100 different views, or in other words, may be able to perceive approximately 100 different horizontal positions. The number of vertical positions (or vertical parallax positions) would be less in number. For example, 5 vertical views may be sufficient. Accordingly, with 100 horizontal views and 5 vertical views, a total of approximately 500 different views or image summations would be necessary with each desired to be formed of a sufficient resolution, for example that of a high quality television display.

Figure 1:
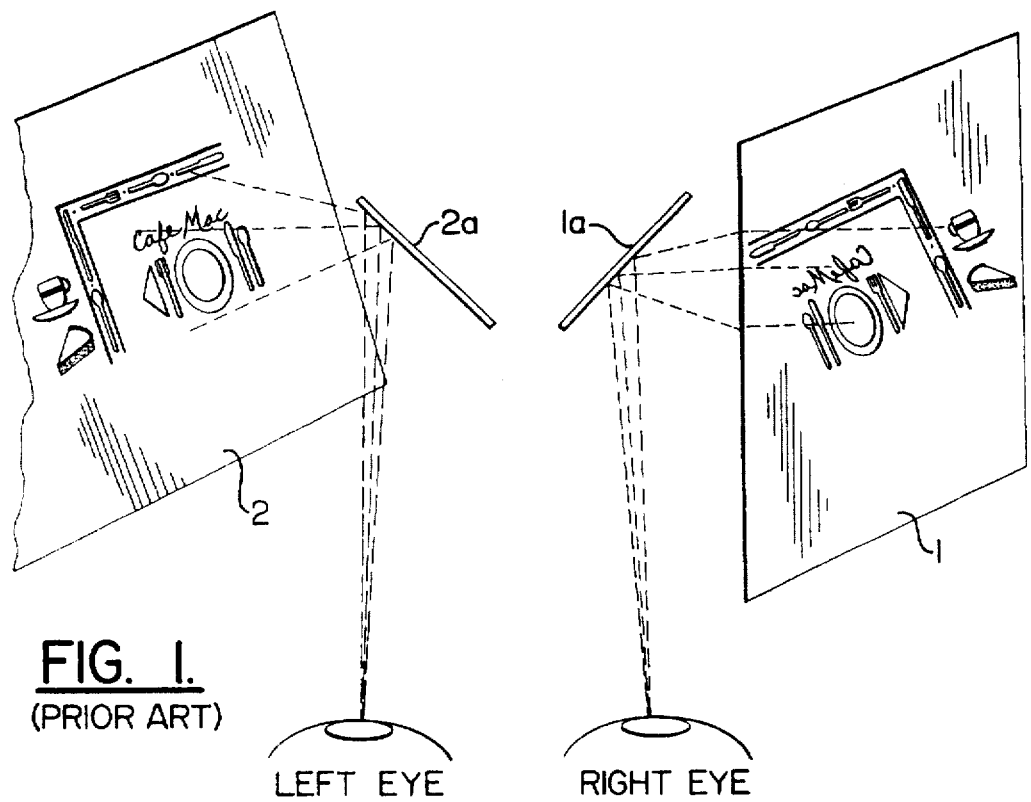
FIG. 1 illustrates a conventional stereoscope arrangement for producing a three-dimensional image.
Figure 2:
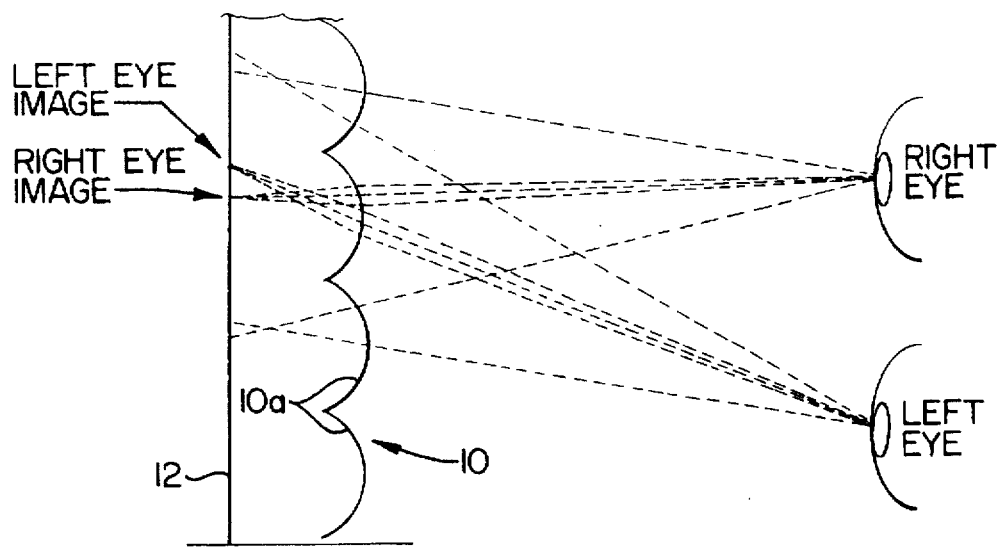
FIG. 2 illustrates a lenticular lens approach for providing a three-dimensional image.
Figure 3A:
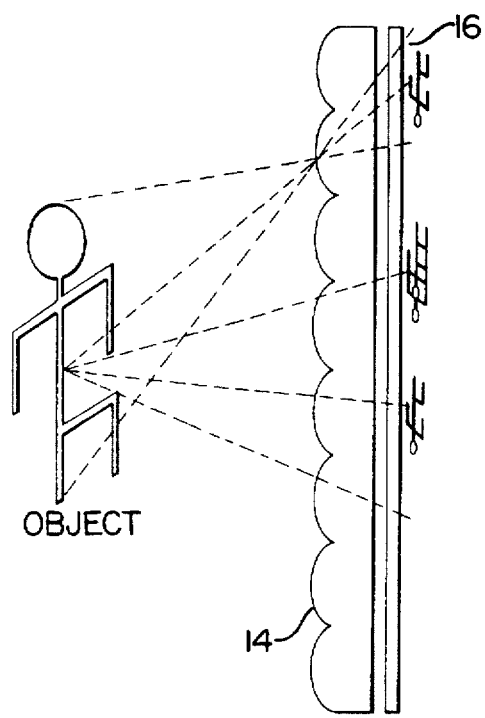
FIGS. 3A and 3B illustrate arrangements for respectively recording and reconstructing a three-dimensional image utilizing a fly's eye lens approach.
Figure 3B:
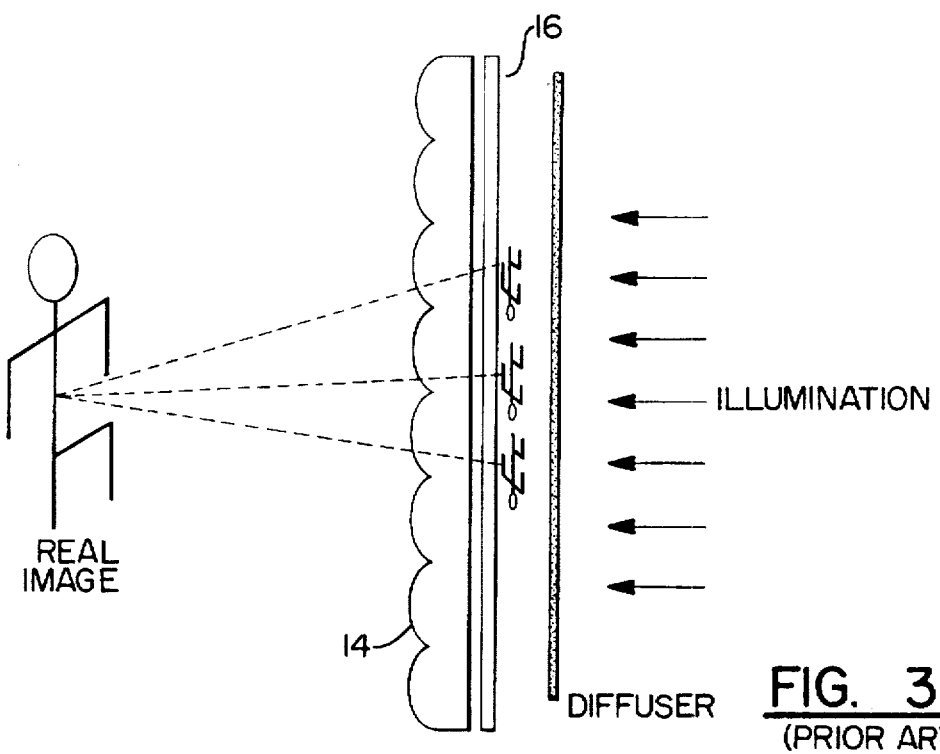
Figure 4:
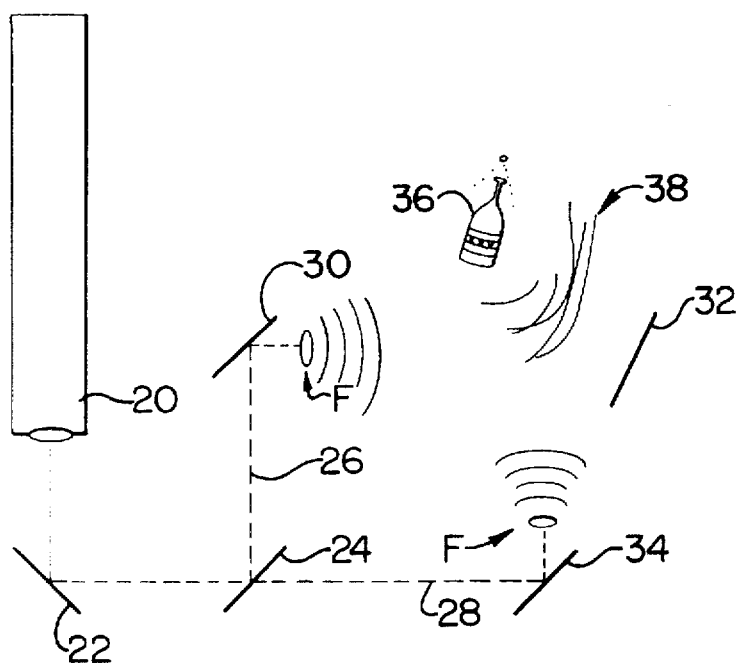
FIGS. 4 and 5 demonstrate forming and reconstructing a three-dimensional image on a holographic plate.
Figure 5:
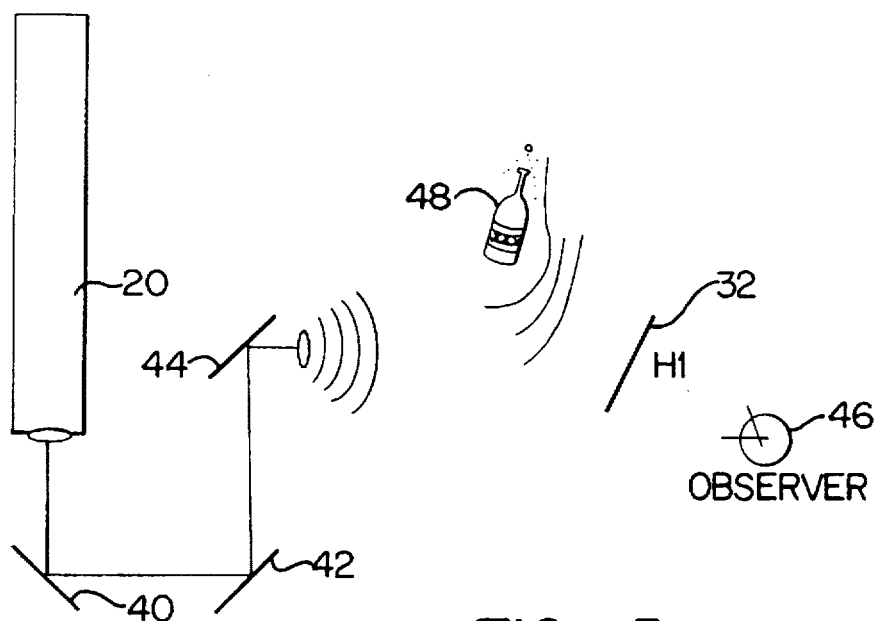
Figure 6:
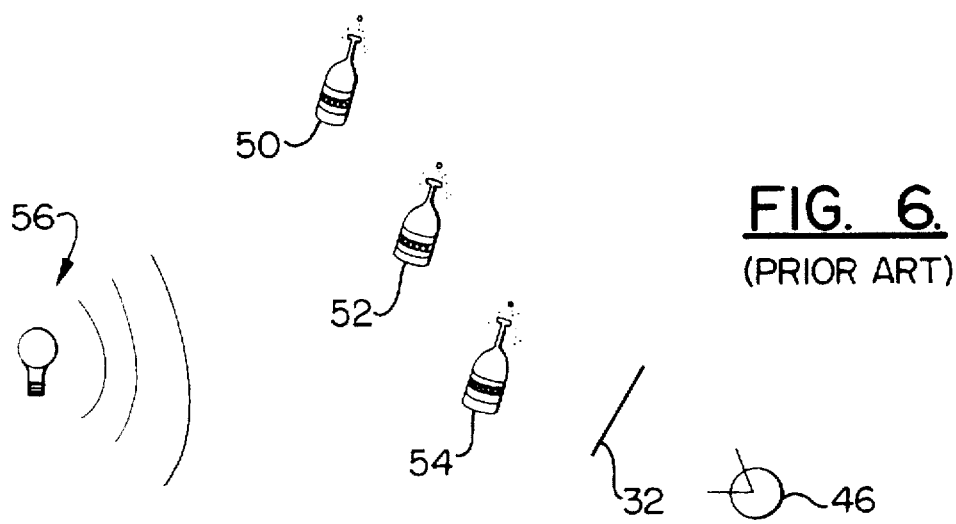
FIG. 6 illustrates the affect of reconstruction of a holographic image with a white light source.
Figure 7:
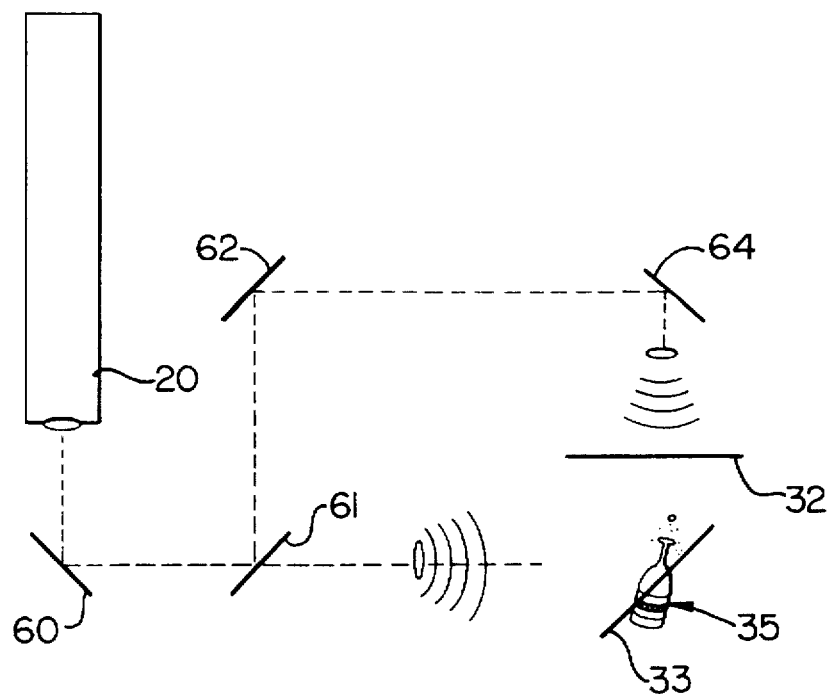
FIG. 7 illustrates an arrangement for forming a transmission hologram.
Figure 8:
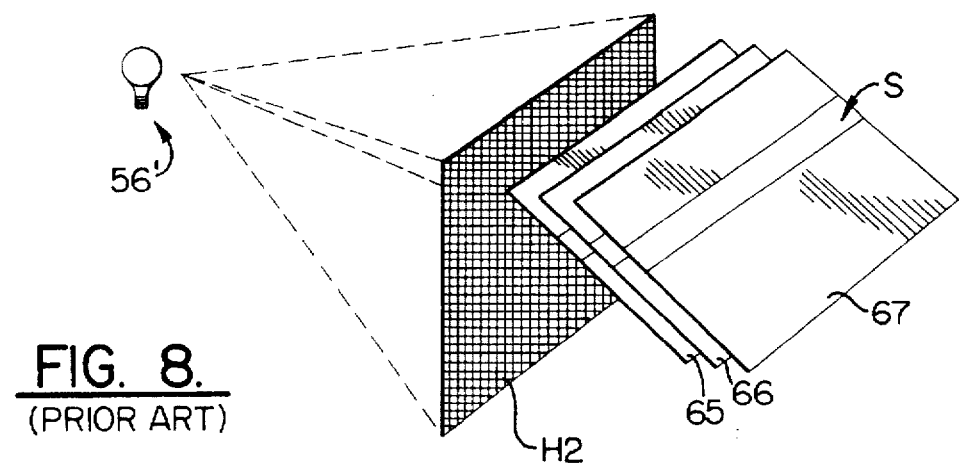
FIG. 8 illustrates a reconstruction of a rainbow hologram.
Figure 9:
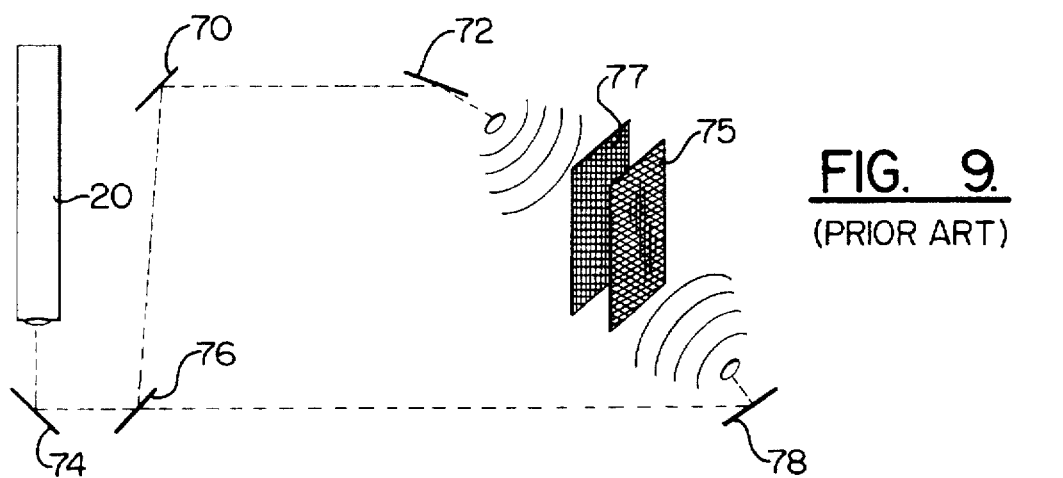
FIG. 9 illustrates a reflection transfer hologram.
Figure 10:
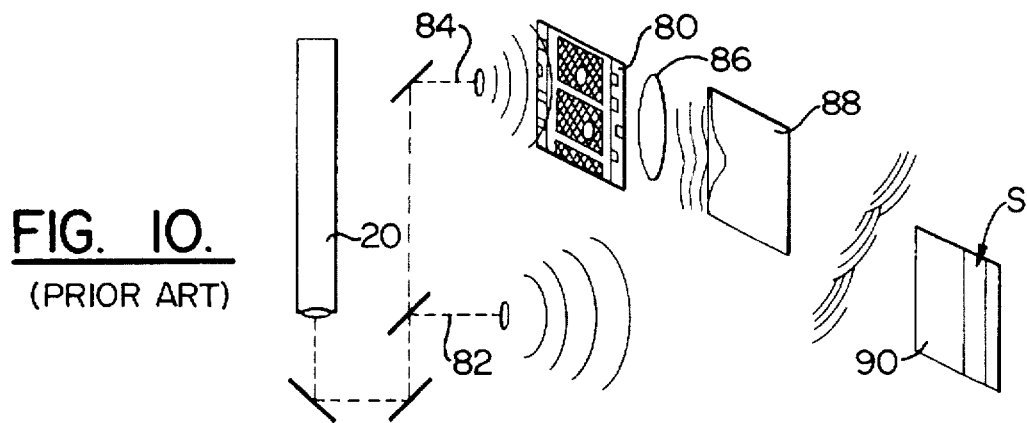
FIG. 10 illustrates formation of a holographic stereogram.
Figure 11:
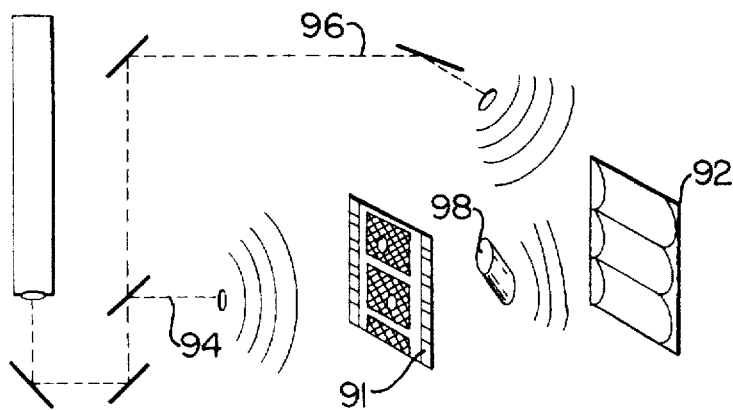
FIG. 11 illustrates formation of a multiplex hologram.

In accordance with one aspect of the present invention, the various views are provided with a sufficient degree of resolution by drawing upon the concepts of the holographic stereogram arrangement discussed earlier with reference to FIG. 10. More particularly, as discussed earlier, when the image is being stored in the holographic stereogram arrangement of FIG. 10, the image stored is actually that which is formed on a display screen 88. Thus, the process is simplified since only a single object or article is being recorded each time (i.e., the diffusion screen 88), with the intensities of the different parts of the diffusion screen 88 changing as a different image is displayed upon the diffusion screen, and with the pairs of views spaced 65 mm corresponding to stereo pairs. Thus, by recognizing the simplification of this approach, the computations necessary are dramatically reduced as compared with a situation where the actual diffraction grating of a number of images were to be completely calculated.

More particularly, the simulation of a holographic diffraction pattern for a real world scene would involve a high degree of complexity dependent upon:

(1) the number of individual points on the holographic plate which must be calculated; and (2) the calculation associated with each point.

For a resolution of 1 µm of a holographic plate with a diffraction angle of 30°, and a 20 cm×20 cm display, we have:

$$(1000 \text{ points/mm} \times 200 \text{ mm})^2$$

or $$4 \times 10^{10} \text{ individual points}$$

Each point requires a computationally intensive calculation itself. Suppose an image included 10,000 distinct objects in the field of view of a holographic plate which is to be computationally simulated. Each object can be decomposed into a number of light sources contributing to the intensity at each point of the holographic display. We will assume each object is decomposable into 10,000 individual points of light (this is much higher resolution than that of a high quality television or movie display, and is provided merely as an illustrative example). For a 20 cm×20 cm display, with 1 µm resolution and 10,000 objects, the number of operations necessary would be:

$$10^8 \times 4 \times 10^{10}$$

or $$4 \times 10^{18}$$

Assuming we have 400 of the 1 cm processors (e.g. in a 20 cm×20 cm display) each capable of $10^8$ operations per second, the computation time would be $10^7$ seconds, which clearly would be unacceptable.

Utilizing the stereogram model display in accordance with the present invention, providing 500 computer graphic images (i.e. 100 horizontal and 5 vertical parallax), each having a size of 500×500 (i.e. the number of display points for a typical computer display screen), the total number of required resolvable points would be:

$$5 \times 100 \times 500 \times 500$$

or $$1.25 \times 10^8 \text{ resolvable points.}$$

For each point the intensity must also be calculated. In a ray tracing approach, for example, a ray must be projected through each of the $1.25 \times 10^8$ points to determine which of the $10^4$ objects it hits. This results in a computational complexity of:

$$1.25 \times 10^8 \times 10^4$$

or $$1.25 \times 10^{12} \text{ calculations.}$$

Since we have 400 processors (i.e. 400 of the VLSI die in the illustrative 20 cm×20 cm display), each capable of $10^8$ operations/sec., the resulting computation time is on the order of 2–25 seconds. However, this is for a complex display (10,000 objects), and for images comparable to a movie or television display, the computational time is sufficiently short such that the image signal received by the photodetector can be processed and displayed on a substantially real time basis.

Figure 17A:
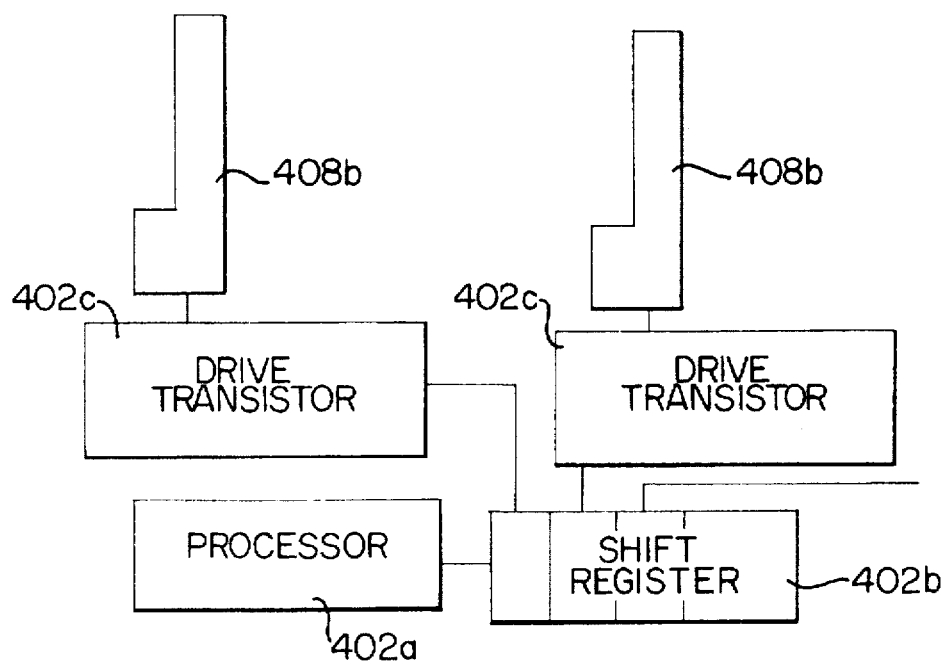
FIGS. 17A–17D schematically depict different processor/drive arrangements for controlling the application of a voltage to the electrodes.

The display can be provided in varying degrees of complexity as will now be discussed with reference to FIGS. 17A–D. For example, a simpler version of the display can be provided by utilizing horizontal parallax only (i.e., no vertical parallax), with the display monochromatic. FIG. 17A illustrates the required electronics for a simple, binary, monochromatic, horizontal parallax only display device with single buffering. The electronics will include a processor 402a, shift register 402b, and drive transistors 402c for operating the horizontal electrodes 408b. The system is binary since the electrodes will be only in one of two states (on or off). The processor, shift register and drive transistors 402a, 402b, 402c are each formed in the processor layer (302, FIG. 15) of the VLSI die. The processor 402a loads up the bits of the horizontal shift register 402b serially, and the bits of the shift register directly drive the horizontal electrode drive transistors. Since the image is monochromatic in the FIG. 17A arrangement, there is no need to store a sequence of bits for the various colors. During the update of the shift registers (i.e. for producing a new image or an updated image), the image will not be correct as the processor loads up the bits serially, however the switching speed should be sufficient such that the incorrect transition image would not be observable to the viewer. Moreover, it is possible to have a pair of shift registers 402b, such that one is displaying a current image while another is being loaded for the subsequent image. Since the FIG. 17A image provides horizontal parallax only, the vertical electrodes need only be driven with a fixed signal (or more precisely a fixed pattern of the vertical electrodes are energized for a particular image) which causes the incident light beam to tip into the eyes of the viewer.

Figure 17B:
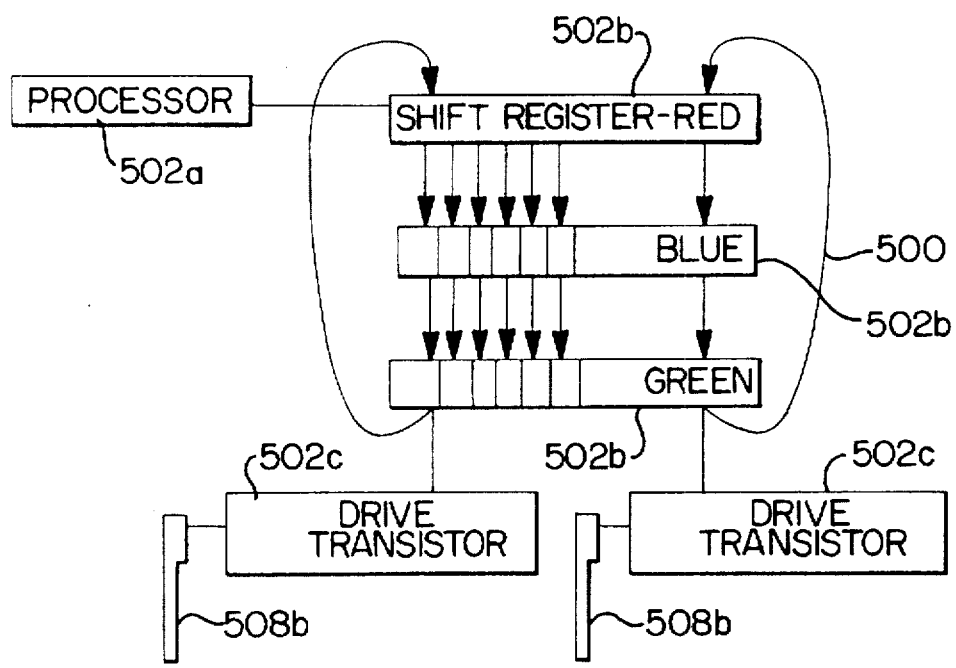

FIG. 17B illustrates the electronics necessary for a binary, full-color, horizontal parallax only display device, and, as with the FIG. 17A arrangement, the electronics are formed in the processor layer of the VLSI chip or VLSI die (302, FIG. 15). Referring to FIG. 17B, in the horizontal parallax only full-color display, a processor 502a must load a plurality of shift registers 502b, each of which corresponds to a monochromatic component of the image. More particularly, as shown in FIG. 17B, three shift registers 502b would be provided corresponding to red, blue and green components of the full color image. Once the three shift registers 502b are loaded by the processor 502a, they are applied sequentially to the horizontal drive transistors 502c for operating the horizontal electrodes 508b.

The contents of the three shift registers circulate among themselves as represented at 500 such that the display is constantly refreshed. More particularly, when the information regarding one of the color components is supplied to the drive transistors (e.g. the green information shown in FIG. 17B), the refreshed information relating to another component (e.g. the red information in FIG. 17B) is being supplied by the processor. After the green component information has been supplied to the drive transistors, the blue information shifts to the next shift register (the lower most shift register in the figure) for display, the refreshed red information moves to the shift register depicted schematically as a center shift register, and the processor supplies refreshed green component information to the top shift register. As with the FIG. 17A arrangement, since the display is horizontal parallax only, the vertical electrodes need only be driven with a fixed pattern signal which causes the incident light beam to tip into the eyes of the viewer.

Figure 17C:
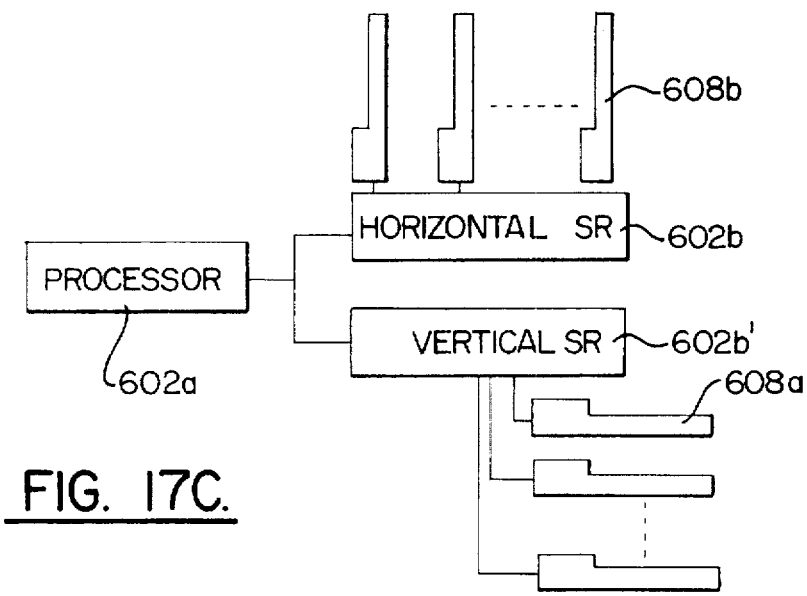

FIG. 17C illustrates the required electronics for a binary, full-color, display device with horizontal and vertical parallax. In this instance, the processor 602a must load both a horizontal shift register 602b and a vertical shift register 602b' so that the vertical electrodes 608a are driven to diffract light in different tip angles. As discussed earlier, only a few tip angles are necessary. For example, five vertical parallax views would provide a good vertical parallax feel. By contrast, the number of horizontal parallax views provided by the horizontal electrodes 608b would be significantly greater. The drive transistors are omitted from FIG. 17C for simplification of the illustration. As with the FIGS. 17A–B arrangements, it is to be understood that the various electronics are formed in the processor layer (302, FIG. 15).

Figure 17D:
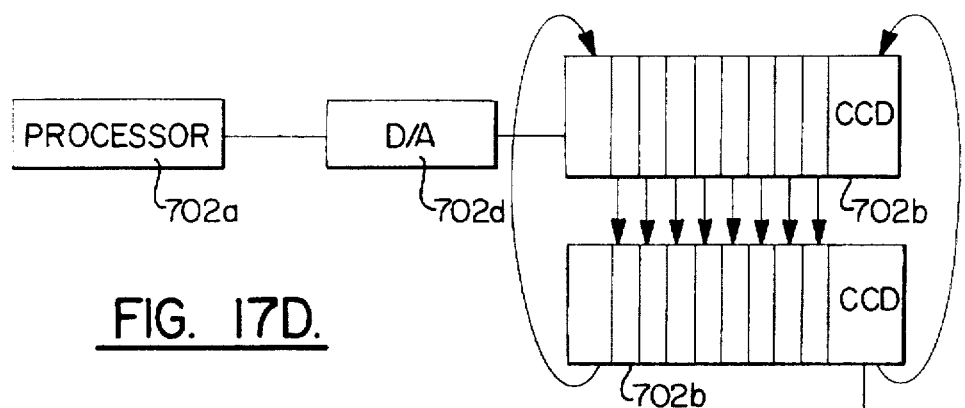

A more sophisticated arrangement is shown in FIG. 17D which illustrates the required electronics for a continuous-tone, full-color, vertical and horizontal parallax display device. In the FIG. 17D arrangement, the binary shift registers of the earlier arrangements are replaced with an analog storage device, such as a charge couple device (CCD) 702b which is driven by the processor 702a by a digital-analog converter 702d. As in the earlier embodiments, the electronics operate the electrodes 708 (although only one electrode is shown, it is to be understood that shift registers are provided for both the horizontal and vertical electrodes where both horizontal and vertical parallax is desired) through drive transistors 702c. However, utilizing the analog storage device, the voltage applied to the electrode can be varied as compared with the binary arrangements in which the electrode shifts between two positions (on and off). Thus, the FIG. 17D arrangement provides even more flexibility such that the image would be even more continuous. In other words, it is possible to provide a greater number of images or a smoother transition from one image to another.

As discussed earlier, a significant aspect of the present invention resides in the computational simplification utilized in determining the plurality of images for the plurality of respective vantage points. For a given type of display (i.e. 17A–D), and a given display size, the capability of the display can be determined by:

1. Determining the total VLSI real estate available;
2. Subtracting the area required for the electrodes;
3. Subtracting the area for storage registers (FF's) needed to hold the grating patterns;
4. Subtracting the area required for drive transistors and diffractive electrodes; and
5. Dividing the remaining area into transistor equivalents assuming each transistor is 5 μm per side, and then where each is 10 μm per side. For a simple horizontal parallax only, monochromatic display (FIG. 17A) with each of the 400 VLSI die 1 cm×1 cm and consisting of a 10×10 array of 1 mm×1 mm displays, we have:

| Size | Units | Description |
|---|---|---|
| 1,000,000 device | μm² | Base area of 1 mm × 1 mm |
| –100,000 | μm² | Area taken up by strip 1000 μm × 100 μm for feed through |

-continued

| Size | Units | Description |
|---|---|---|
| −112,500 | μm² | for electrodes<br>Area taken up by shift register and drive transistors:<br>6 transistors/shift register stage; 5 μm × 5 μm per transistor; total = 150 μm²<br>450 stages = 67,500 μm²<br>drive transistor, 1/stage @ 10 μm × 10 μm = 45,000 μm² |
| 787,500 | μm² | Net area remaining for computational device per hoxel |
| 78,500,000 | μm² | Net area remaining on 1 cm × 1 cm device |
| 3,140,000 | t (number of transistors) | Net real estate remaining in 1 cm × 1 cm device in equivalent transistors @ 5 μm × 5 μm per transistor. |
| 785,000 | t (number of transistors) | Net real estate remaining in 1 cm × 1 cm device in equivalent transistors @ 10 μm × 10 μm per transistor. |

For the same 1 cm×1 cm VLSI die, with a binary horizontal parallax only color display (FIG. 17B), we have:

| Size | Units | Description |
|---|---|---|
| 1,000,000 device | μm² | Base area of 1 mm × 1 mm |
| −100,000 | μm² | Area taken up by strip 1000 μm × 100 μm for feed through for electrodes |
| −247,500 | μm² | Area taken up by shift register and drive transistors:<br>6 transistors/shift register stage; 5 μm × 5 μm per transistor; total = 150 μm²<br>450 stages = 67,500 μm²<br>3 copies = 202,500 μm²<br>drive transistor, 1/stage @ 10 μm × 10 μm = 45,000 μm² |
| 652,500 | μm² | Net area remaining for computational device per hoxel |
| 62,250,000 | μm² | Net area remaining on 1 cm × 1 cm device |
| 2,610,000 | t (number of transistors) | Net real estate remaining in 1 cm × 1 cm device in equivalent transistors @ 5 μm × 5 μm per transistor. |
| 625,000 | t (number of transistors) | Net real estate remaining in 1 cm × 1 cm device in equivalent transistors @ 10 μm × 10 μm per transistor. |

For a binary vertical parallax and horizontal parallax (FIG. 17C) we have:

| Size | Units | Description |
|---|---|---|
| 1,000,000 device | μm² | Base area of 1 mm × 1 mm |
| −200,000 | μm² | Area taken up by strip 1000 μm × 100 μm × 2 for feed through for electrodes |
| −225,500 | μm² | Area taken up by shift register and drive transistors:<br>6 transistors/shift register stage; 5 μm × 5 μm per transistor; total = 150 μm²<br>450 stages = 67,500 μm²<br>2 copies = 135,000 μm²<br>drive transistor, 1/stage @ |
| 775,000 | μm² | 10 μm × 10 μm = 90,000 μm²<br>Net area remaining for computational device per hoxel |
| 77,500,000 | μm² | Net area remaining on 1 cm × 1 cm device |
| 3,100,000 | t (number of transistors) | Net real estate remaining in 1 cm × 1 cm device in equivalent transistors @ 5 μm × 5 μm per transistor. |
| 775,000 | t (number of transistors) | Net real estate remaining in 1 cm × 1 cm device in equivalent transistors @ 10 μm × 10 μm per transistor. |

For the display with continuous electrode voltages (FIG. 17D):

| Size | Units | Description |
|---|---|---|
| 1,000,000 device | μm² | Base area of 1 mm × 1 mm |
| −200,000 | μm² | Area taken up by strip 1000 μm × 100 μm × 2 for feed through for electrodes |
| −492,000 | μm² | Area taken up by shift register and drive transistors:<br>6 transistors/shift register stage; 5 μm × 5 μm per transistor; total = 150 μm²<br>450 stages = 67,500 μm²<br>3 levels = 201,000 μm²<br>2 copies = 402,000 μm²<br>drive transistor, 1/stage @ 10 μm × 10 μm = 90,000 μm² |
| 308,000 | μm² | Net area remaining for computational device per hoxel |
| 30,800,000 | μm² | Net area remaining on 1 cm × 1 cm device |
| 1,230,000 | t (number of transistors) | Net real estate remaining in 1 cm × 1 cm device in equivalent transistors @ 5 μm × 5 μm per transistor. |
| 123,000 | t (number of transistors) | Net real estate remaining in 1 cm × 1 cm device in equivalent transistors @ 10 μm × 10 μm per transistor. |

Figure 18:
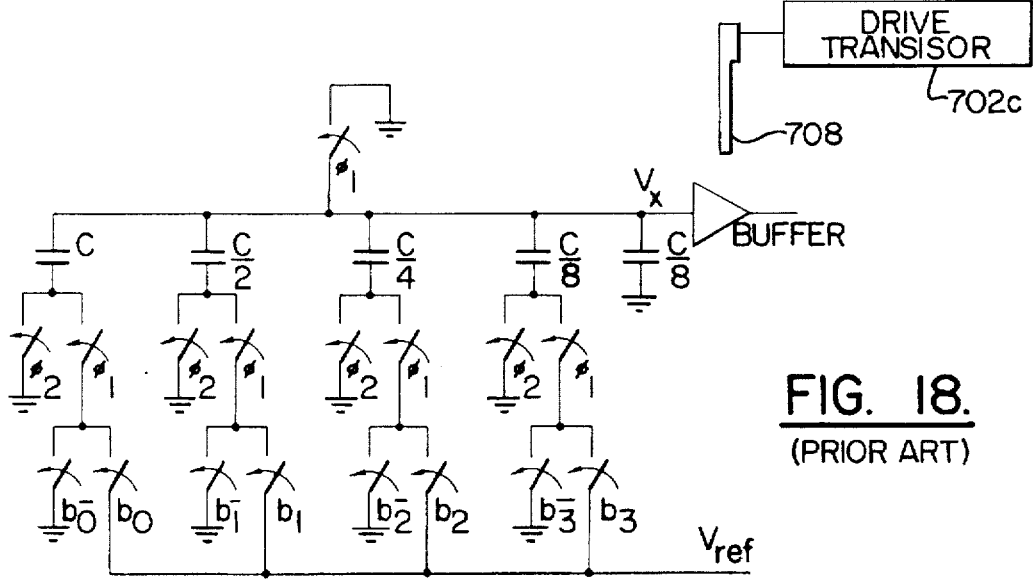
FIG. 18 schematically illustrates a switched capacitor digital-analog converter.

FIG. 18 shows an example of a switched capacitor digital-analog converter which is suitable for VLSI technology as in the present invention. The arrangement shown in FIG. 18 is known, and thus, in and of itself is not a contribution of the present invention. Rather, the FIG. 18 arrangement is provided merely to demonstrate that digital-analog converters are known which do not require resistors, and thus are suitable for use in VLSI technology. Similarly, FIG. 19 provides an example of a RAM cell with a photodetector which can be formed in an integrated circuit. As shown in FIG. 19, light passing through the diode results in discharging of the transistors M1, M2.

Referring now FIG. 20, a brief description of the overall display process will be described.

Initially, image information is provided as indicated at S1. As discussed earlier, this may be by a camera which is moving such that information corresponding to different views and dimensions is provided. The image information may also be provided by two or more cameras to provide different perspective information. In addition, the image information may be computer generated or a combination of computer generated and information generated by a camera(s) or other image recording device. The image information is then coded as indicated at S2, such that the image information can be converted to a light signal. Preferably, this includes providing a signal which includes both image and time information in a single signal in a manner such as by Manchester coding. The coded signal is then transmitted (S3) for reception, for example by a photodetector (212) as indicated at S4. The image rendering operation then occurs as indicated at S5. The image rendering includes calculation of the plurality of different images for the respective different vantage points for a given image forming technique, with the determination of the various images occurring in the processor layer of each VLSI die. Thus, in the image rendering operation, a determination is made as to which electrodes require activation for producing each of the respective images simultaneously, with the electrodes activated to form the display as indicated at S6.

Figure 22:
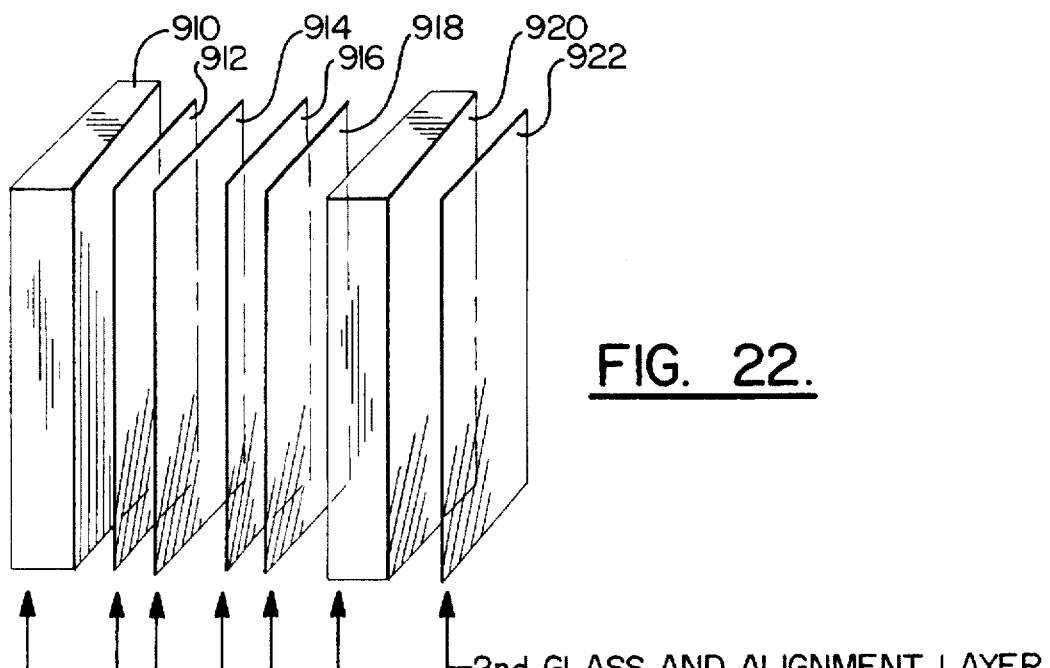
Figure 23:
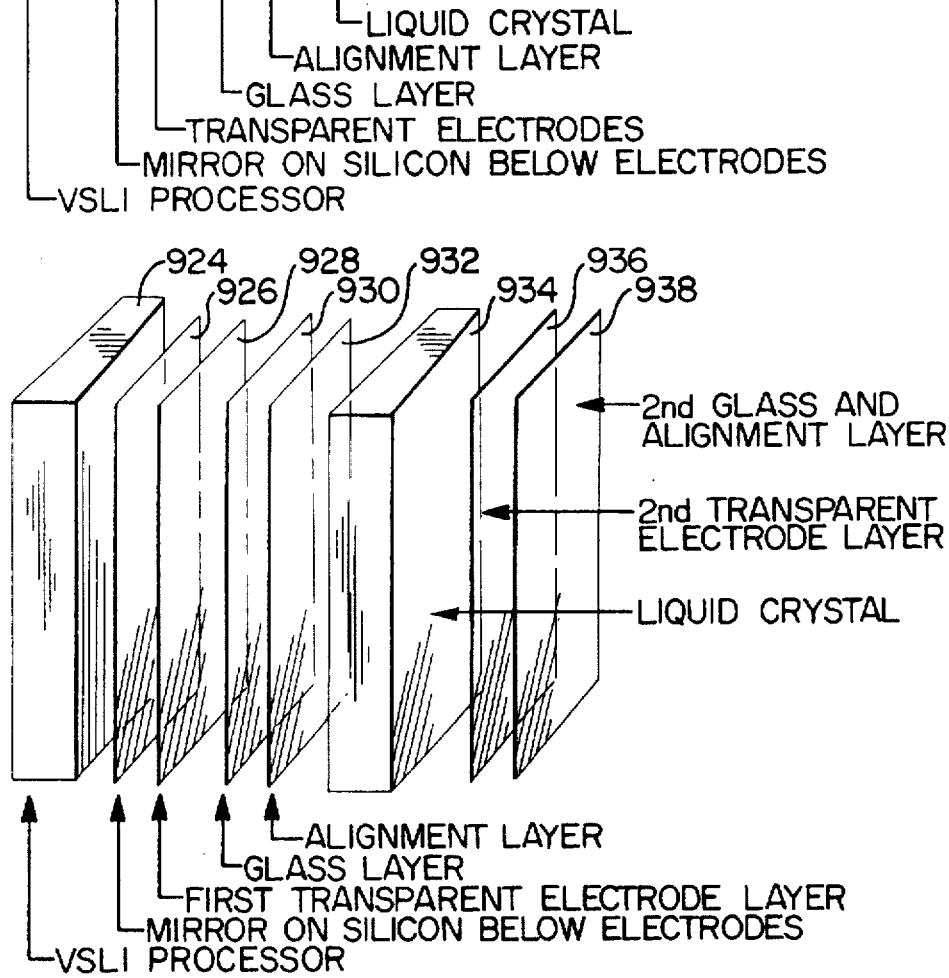

Referring now to FIGS. 21–23, additional embodiments of the present invention will be described. For comparison purposes, FIG. 21 shows a simplified schematic representation of the various layers of a display device in accordance with the present invention similar to that shown in FIG. 15. As shown in FIG. 21, the display includes the VLSI processor 900, the horizontal and vertical metal electrodes 902, a glass and alignment layer 904, liquid crystal layer 906 and a second glass and alignment layer 908. In accordance with another aspect of the present invention, it has been recognized that metal electrodes can themselves form a mechanical diffraction grading, and this can produce significant aberrations in the reconstructed images.

The arrangement of FIG. 22 can provide a solution to the above-mentioned problem of metal electrodes, principally by replacing the metal electrodes with transparent electrodes. The transparent electrodes can be formed, for example, of Indium Tin Oxide. As shown in FIG. 22, such an arrangement can include a VLSI processor layer 910, upon which is superposed a mirror 912. Above the mirror 912, the transparent horizontal and vertical electrodes 914 are provided, corresponding in function to the orthogonally arranged metal electrodes discussed hereinearlier with reference to FIGS. 16A and 16B, however formed of a transparent material, such as Indium Tin Oxide. Above the electrode layer are a glass layer 916, alignment layer 918, the liquid crystal layer 920 and a second glass and alignment layer 922.

A modified form of the FIG. 22 arrangement is shown in FIG. 23. As with the FIG. 22 arrangement, the FIG. 23 arrangement utilizes transparent electrodes, with a mirror provided on the silicon VLSI processor. However, in the FIG. 23 arrangement, one set of electrodes is provided below the liquid crystal layer, while the other is provided above the liquid crystal layer. More particularly, as shown in FIG. 23, a first transparent electrode layer 928 is provided above the silicon, while the other transparent electrode layer 936 is disposed above the liquid crystal layer 934 and below the second glass and alignment layer 938. Thus, the FIG. 23 arrangement includes a VLSI processor 924, mirror 926, a first transparent electrode layer 928, glass layer 930, alignment layer 932, liquid crystal layer 934, with the second transparent electrode layer 936 provided beneath the glass and alignment layer 938.

The FIG. 23 arrangement can reduce the complexity in the fabrication of the VLSI processor, since a layer is transferred to the cover glass together with flip-flop storage units for this layer. The provision of ITO electrodes on glass is a standard practice in the development of non-diffractive liquid crystal displays as is the deposition of thin film transistors on glass (for the flip-flops), and thus the provision of the electrode layer and flip-flop storage units upon and beneath the cover glass does not pose a technical problem.

The arrangement of FIG. 23 avoids the possibility of the orthogonal electrode layers occluding or interfering with one another as could result where the orthogonal electrode layers are superposed. Further, the FIG. 23 arrangement may provide for higher resolution. However, the FIG. 22 arrangement may ultimately be less expensive from a manufacturing standpoint. Further in this regard, it should be noted that although the number of layers provided (particularly in the FIG. 22 arrangement) of the integrated circuit element is greater than that normally manageable in manufacture of integrated circuits (typically manufacturing difficulties are encountered at four or more layers, due to irregular topographies of the various layers), due to the fact that at least one of the layers (i.e., the mirror layer of FIG. 22) is planar, and further since the electrode layers are provided in a very regular pattern (substantially straight electrodes), the topography of the various layers are very regular, and therefore are quite manageable. In addition, the Indium electrodes are very small, at least partially due to the fact that the electrodes do not carry current, but only provide an electrical field for inducing gratings in the liquid crystal or electro-optical material, thus also making the topography manageable.

Although a mirror (e.g., in FIGS. 22 and 23) is utilized such that a front lit hologram is provided, the foregoing arrangements should not be confused with a true reflection hologram as will be readily appreciated with reference to FIGS. 24A and 24B. FIG. 24A depicts a true reflection hologram in which the fringe patterns are set up parallel to the holographic plate (i.e., extending from top to bottom in FIG. 24A). In a reflection hologram (FIG. 24A), light enters the front of the hologram H, and a small amount of the light is reflected backwards as the light impinges upon a fringe F in the plate. A reflection hologram is designed such that the fringes are spaced at a wavelength of one frequency of visible light, such that only one frequency (color) is reflected efficiently. Typically, reflection holograms are many wavelengths thick (e.g., 5–10 micrometers), and the diffraction is referred to as Bragg diffraction.

By contrast, with the present invention, the display acts as a transmission hologram, and the light which enters the front of the display is reflected specularly by the mirror, and thus, acts as a back-lit hologram with the light coming from behind the grating as shown in FIG. 24B. Thus, as schematically represented in FIG. 24B, the gratings G run front to back (i.e., perpendicular to the plate H) causing Frauenhoffer diffraction. In a transmission hologram the thickness is typically very thin (1–2 micrometers), and is not wavelength specific.

Now referring to FIG. 25, a further embodiment is shown in which a waveguide illuminator is utilized, such that an edge lit display is provided, thus obviating the need for overhead illumination which is often awkward. The layers of the waveguide illuminator arrangement include the processor 940, electrodes 942, glass cover 944, reflection layer 946, polyimide layer 948 (which can perform insulating or passivating functions), an alignment layer 950, liquid crystal layer 952, a second alignment layer 954, polyimide layer 956, the cover electrode 958, cover glass 960 and waveguide illuminator 962. The waveguide can be formed as a thin layer of optical material, such as a thin polymer film. When light is directed into the edge of the waveguide, with the light then passes into the display and is reflected by the reflection or mirror layer 946. The light is reflected by the reflection layer, such that the light exits perpendicular to the waveguide, and thus the waveguide does not impede the light diffracted out by the display.

Figure 26:
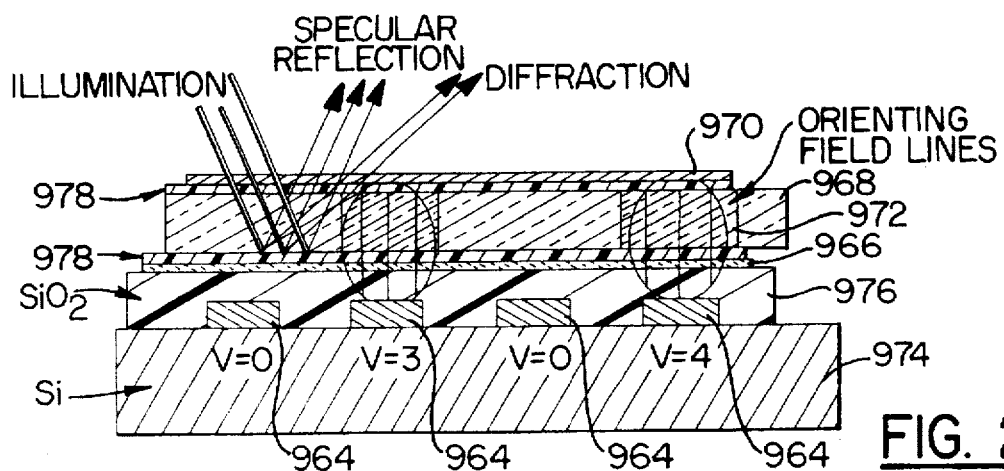
FIG. 26 shows an alternate arrangement for avoiding the formation of a mechanical grating by metal electrodes.

Referring now to FIG. 26, an alternate arrangement is shown in which metal electrodes can be utilized, however the metal electrodes are blocked by a mirror layer, and thus, such an arrangement can also avoid the problem of undesirable mechanical diffraction grating formed by the metal electrodes. In the FIG. 26 arrangement, only one layer of the plurality of electrodes 964 is shown, for simplification of the illustration, however it is to be understood that two orthogonally disposed electrode layers are to be provided as discussed previously. In the FIG. 26 arrangement, the electrodes 964 are occluded by a thin metal layer, or mirror layer 966. As shown, the mirror layer 966 is formed of a plurality of small squares having dimensions much smaller than the optical wavelength. As a result, light is prevented from penetrating and diffracting off of the metal electrodes 964. Thus, only diffraction patterns created in the liquid crystal layer 968 result in diffracted light. The mirror layer 966 can be referred to as a "floating" layer since it is non-grounded. The voltage can thus pass through the metal layer, such that an electric field is formed between the electrodes 964 and the ground layer (e.g. ITO) 970. Thus, gratings can be formed as shown at 972 in the liquid crystal material 968. The layer 974 corresponds to the substrate layer, which can be formed, for example, of a silicon ceramic above which the VLSI 977 including the electrodes is disposed. The layers shown at 978 correspond to polyimide or passivation layers. The varying voltage values assigned to the electrodes 964 in FIG. 26 is provided merely as an example that different voltages can be applied to the different electrodes to form desired orienting field lines or gratings. Although the FIG. 26 arrangement provides a solution to the mechanical diffraction problem, the FIGS. 22 and 23 arrangements are currently preferred.

Figure 27:
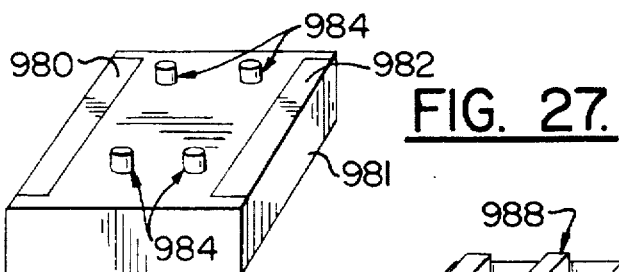
FIGS. 27-29 illustrate the connection of power and ground in a multi-chip package.

As discussed earlier, the 1 cm×1 cm elements can be assembled in a multi-chip module as shown in FIG. 14. An alternate arrangement for the overall assembly together with an arrangement for supplying a power to the display will now be described with reference to FIGS. 27–29. FIG. 27 illustrates an arrangement for providing power and ground to a die element 981 (i.e., corresponding to a 1 cm×1 cm element as discussed hereinearlier). As shown in FIG. 27, in accordance with another aspect of the present invention, the power and ground can be provided utilizing a power rail 980 and a ground rail 982 extending along each side of the chip as shown. As would be readily understood by one skilled in the art, a plurality of spacers 984 are also provided on each element, thereby allowing proper spacing between the element and the cover glass for disposition of the electro-optical material. Preferably, the power and ground rails 980, 982 are formed of a transparent material, such as Indium, thereby avoiding introduction of any aberrations. The description of the power and ground rails was omitted from the earlier descriptions of the various layers shown, for example, in FIGS. 21–23, in order to avoid confusion. Briefly, with reference to the arrangement of FIG. 23, it is to be understood that the power and ground rails extend from the VLSI processor layer 924 and through the layers 926–936.

Figure 28:
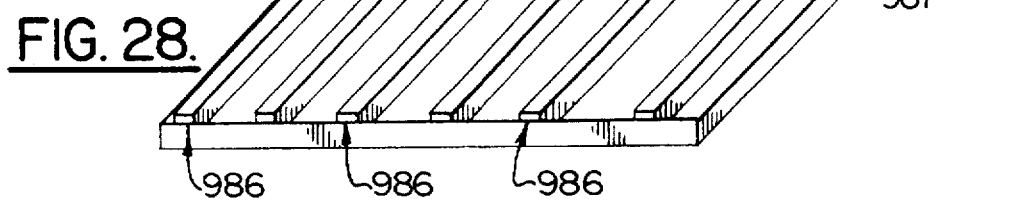
Figure 29:
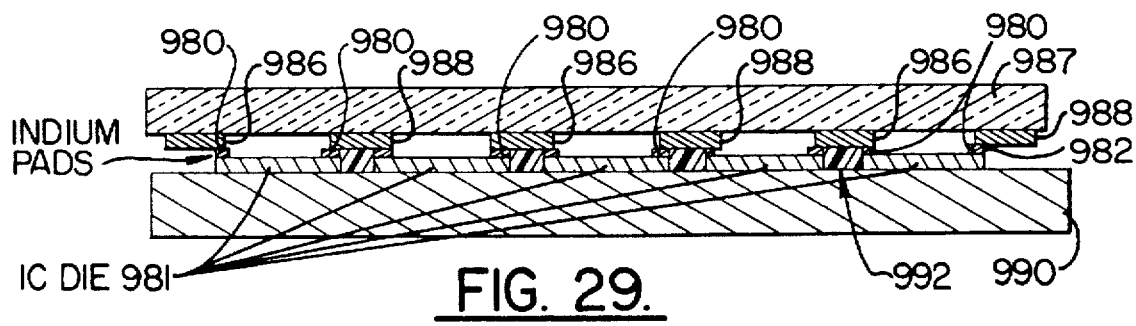

Transparent power and ground rails are also provided on the glass cover (e.g., the glass cover 938 in FIG. 23) as shown in FIG. 28. FIG. 28 shows a representation of the glass cover (more accurately a portion of the glass cover) with the glass cover shown in an orientation which is upside-down from that in which the cover is disposed in the overall assembly. As shown in FIG. 28, the glass cover includes alternating power and ground rails, for example with the power rails shown at 986 and the ground rails shown at 988. Although discussed earlier, it is important to reiterate that the signal information is not carried by the power and ground arrangement, since the signal information for images to be reconstructed is provided optically. Thus, the power and ground rails can be formed quite small, for example, 10 micrometers in height and 100 micrometers in width. Accordingly, it is to be understood that the respective sizes of the power and ground rails in FIGS. 27–29 is greatly exaggerated for illustrative purposes. The spacing between a power and a ground rail is thus approximately 1 cm, while the width of each power and ground rail is only approximately 100 micrometers. The power and ground rails of FIG. 28 are also preferably formed of a transparent material, such as Indium. Although only three ground rails and three power rails are depicted in FIG. 28, it is to be understood that the number of power and ground rails depends upon the number of rows of VLSI die provided in the array which forms the overall display. For example, in a 10×10 array, five or six power rails and six or five ground rails would be provided, since a given power or ground rail can service adjacent chips disposed on either side of the rail.

FIG. 29 illustrates the overall package including the chips or die of FIG. 27 and the glass cover of FIG. 28. As with FIGS. 27 and 28, the respective sizings in FIG. 29 are greatly exaggerated for illustrative purposes. As shown in FIG. 29, with the glass cover 987 disposed upside-down from that shown in FIG. 28, the power and ground rails 986, 988 contact the respective power and ground rails 980, 982 of each chip or die 981. The die 981 are arranged on a substrate 990 which provides mechanical strength, with an epoxy 992 provided in the space between each respective die 981. In order to provide additional power, the epoxy can be embedded with conductors, for example gold or another suitable material, such that additional power can be provided from the rails of the glass cover to the VLSI die.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of rendering a holographic image of a three dimensional object, the method comprising the steps of:
    producing a series of two dimensional projections of the object for a plane which is coincident with a plane of a display device;
    producing wavefront interference information, independent of the object data in the series of two dimensional projections of the object, relative to an intermediate plane located at a predetermined position relative to the display device;
    combining the two dimensional projections and the wavefront interference information following said steps of producing the series of two dimensional projections of the object and producing wavefront interference information; and
    creating a diffraction grating in the display device following said combining step based upon a combination of the two dimensional projections and the wavefront interference information to thereby provide a holographic image of the object from a number of positions relative to the display device.

2. A method according to claim 1 wherein said step of producing the series of two dimensional projections comprises performing a ray tracing operation.

3. A method according to claim 1 wherein the display device includes an electro-optic material and a pair of electrodes disposed in operable contact with the electro-optic material, and wherein said step of creating a diffraction grating in the display device comprises the steps of:

transmitting an electrical signal to the pair of electrodes in response to the combination of the two dimensional projections and the wavefront interference information; and creating a diffraction grating within the electro-optic material of the display device in response to the transmitted electrical signal.

4. A method according to claim 1 wherein the display device includes a multilayer display module and wherein said step of a creating diffraction grating in the display device comprises the steps of:

generating an electrical signal;

applying the generated electrical signal to a drive transistor located in a first layer of the multilayer display module which produces a drive signal in response thereto;

transmitting the drive signal through at least a second layer of the multilayer display module to an electrical contact layer of the multilayer display module;

transmitting the drive signal from the electrical contact layer to an electro-optic layer comprised of an electro-optic material; and altering the electro-optic material of the electro-optic layer in response to the drive signal transmitted to the electrical contact layer.

5. A method according to claim 1 further comprising the steps of:

illuminating the display device; and diffracting light with the diffraction grating created within the display device to render a holographic image of the three dimensional object.

6. A method of rendering a holographic image comprising the steps of:

acquiring a three dimensional representation of an object;

producing a series of two dimensional projections of the object for a plane which is coincident with a plane of a display device, wherein the series of two dimensional projections of the object are based upon the three dimensional representation of the object;

producing wavefront interference information, independent of the object data in the series of two dimensional projections of the object, relative to an intermediate plane located at a predetermined position relative to the display device;

combining the two dimensional projections and the wavefront interference information following said steps of producing the series of two dimensional projections of the object and producing wavefront interference information; and creating a diffraction grating in the display device following said combining step based upon a combination of the two dimensional projections and the wavefront interference information to thereby provide a holographic image of the object from a number of positions relative to the display device.

7. A method according to claim 6 wherein said step of producing the series of two dimensional projections comprises performing a ray tracing operation.

8. A method according to claim 6 wherein the display device includes an electro-optic material and a pair of electrodes disposed in operable contact with the electro-optic material, and wherein said step of creating a diffraction grating in the display device comprises the steps of:

transmitting an electrical signal to the pair of electrodes in response to the combination of the two dimensional projections and the wavefront interference information; and creating a diffraction grating within the electro-optic material of the display device in response to the transmitted electrical signal.

9. A method according to claim 6 wherein the display device includes a multilayer display module and wherein said step of a creating diffraction grating in the display device comprises the steps of:

generating an electrical signal;

applying the generated electrical signal to a drive transistor located in a first layer of the multilayer display module which produces a drive signal in response thereto;

transmitting the drive signal through at least a second layer of the multilayer display module to an electrical contact layer of the multilayer display module;

transmitting the drive signal from the electrical contact layer to an electro-optic layer comprised of an electro-optic material; and altering the electro-optic material of the electro-optic layer in response to the drive signal transmitted to the electrical contact layer.

10. A method according to claim 6 further comprising the steps of:

illuminating the display device; and diffracting light with the diffraction grating created within the display device to render a holographic image of the three dimensional object.

* * * * *